(12) United States Patent
Hiraishi et al.

(10) Patent No.: US 8,394,871 B2
(45) Date of Patent: Mar. 12, 2013

(54) AQUEOUS INK FOR INKJET RECORDING

(75) Inventors: Atsushi Hiraishi, Wakayama (JP); Masayuki Narita, Wakayama (JP); Takahiro Sato, Wakayama (JP); Kyoichi Shirota, Wakayama (JP); Yasuhiro Doi, Wakayama (JP); Hiroyuki Yoshida, Wakayama (JP); Yusuke Shimizu, Wakayama (JP)

(73) Assignee: KAO Corporation, Tokyo (JP)

(*) Notice: Subject to any disclaimer, the term of this patent is extended or adjusted under 35 U.S.C. 154(b) by 57 days.

(21) Appl. No.: 13/131,221

(22) PCT Filed: Nov. 20, 2009

(86) PCT No.: PCT/JP2009/069730
§ 371 (c)(1),
(2), (4) Date: Jul. 19, 2011

(87) PCT Pub. No.: WO2010/061798
PCT Pub. Date: Jun. 3, 2010

(65) Prior Publication Data
US 2011/0263752 A1    Oct. 27, 2011

(30) Foreign Application Priority Data

Nov. 25, 2008 (JP) ................. 2008-299491
May 15, 2009 (JP) ................. 2009-118468
Jun. 3, 2009 (JP) ................. 2009-134413
Jul. 13, 2009 (JP) ................. 2009-164736
Nov. 5, 2009 (JP) ................. 2009-254289

(51) Int. Cl.
*C09D 11/10*    (2006.01)

(52) U.S. Cl. ........ 523/160; 523/161; 523/206; 524/556; 524/612

(58) Field of Classification Search .................. 523/160, 523/161, 206; 524/556, 612
See application file for complete search history.

(56) References Cited

U.S. PATENT DOCUMENTS

| | | |
|---|---|---|
| 2002/0077385 A1 | 6/2002 | Miyabayashi |
| 2005/0274281 A1 | 12/2005 | Jackson |

FOREIGN PATENT DOCUMENTS

| | | |
|---|---|---|
| JP | 2002-347338 A | 12/2002 |
| JP | 2005-162899 A | 6/2005 |
| JP | 2006-301307 A | 11/2006 |

(Continued)

OTHER PUBLICATIONS

Bhattacharjee et al. Journal of Colloid and Interface Science 307 (2007) 288-295.*

(Continued)

*Primary Examiner* — Vu A Nguyen
(74) *Attorney, Agent, or Firm* — Birch, Stewart, Kolasch & Birch, LLP

(57) ABSTRACT

The present invention provides [1] a water dispersion for ink-jet printing containing chain-like particles each containing anionic organic pigment particles and a cationic polymer, wherein the ratio of organic pigment primary particles forming the chain-like particles to all the pigment primary particles contained in the water dispersion is 10% by number or more; [2] a water-based ink for ink-jet printing containing the water dispersion; [3] a method for producing a water dispersion for ink-jet printing as described above in [1]; and [4] a water-based ink for ink-jet printing containing a water dispersion produced through the method. The water dispersion and water-based ink for ink-jet printing of the present invention realize excellent optical density.

19 Claims, 4 Drawing Sheets

FOREIGN PATENT DOCUMENTS

| | | |
|---|---|---|
| JP | 2007-253360 A | 10/2007 |
| JP | 2008-502790 A | 1/2008 |
| JP | 2008-81545 A | 4/2008 |
| JP | 2008-150535 A | 7/2008 |
| WO | WO 2007/013599 A1 | 2/2007 |

OTHER PUBLICATIONS

International Search Report, dated Dec. 15, 2009 in PCT/JP2009/069730.

* cited by examiner

AQUEOUS INK FOR INKJET RECORDING

FIELD OF THE INVENTION

The present invention relates to a water dispersion for ink-jet printing, a water-based ink for ink-jet printing containing the water dispersion, and a method for producing the water dispersion for ink-jet printing.

BACKGROUND OF THE INVENTION

In ink-jet printing methods, droplets of ink are directly projected onto a recording medium from very fine nozzles and allowed to adhere to the recording medium, to form characters and images. The use of ink-jet printing methods have been rapidly spread because of their various advantages such as easiness of full coloration, low cost, capability of using plain paper as the recording medium, non-contact with printed images and characters, etc.

Among such printing methods, in view of enhancing the weather resistance and water resistance of printed images and characters, an ink-jet printing method utilizing an ink containing an organic pigment as the colorant for color printing has now come to be the dominate method.

Japanese Patent Application Laid-Open (kokai) No. H10-60352 discloses a water-based pigment ink containing a pigment, a polymer dispersant, polyethyleneimine, and a water-soluble solvent, which ink is provided for the purpose of improving fixation of the pigment onto an OHP sheet, etc.

Japanese Patent Application Laid-Open (kokai) No. 2004-123865 discloses an aqueous pigment ink containing a pigment, an anionic dispersant, a cationic water-soluble polymer compound, e.g., polyethyleneimine, and an aqueous medium, which ink is provided for the purpose of improving chroma, optical density and so on in plain paper printing.

Japanese Patent Application Laid-Open (kokai) No. 2004-149633 discloses a pigment ink for ink-jet printing containing dispersed aggregates each being formed by a dispersant and a pigment particle having a size smaller than that of the aggregate, which ink is provided for the purpose of improving image chroma, etc.

Japanese Patent Application Laid-Open (kokai) No. 2006-169325 discloses a liquid for ink-jet printing containing a pigment, a water-soluble resin, a water-soluble organic solvent, and water, and describes a black pigment ink containing beaded carbon black particles of high structure type.

Japanese Patent Application Laid-Open (kokai) No. 2008-38090 discloses a water-based ink for ink-jet printing containing a colorant, and beaded or elongated metal oxide secondary particles each being formed of a plurality of primary particles thereof connected to each other, which ink is provided for the purpose of improving optical density.

Japanese Patent Application Laid-Open (kokai) No. 2006-82073 discloses a method for producing composite particles, the method including a step of adjusting the surface potential of fine particles by modifying the surface of the particles with a polymer compound; and a step of mixing a fluid containing fine particles having a positive surface potential with a fluid containing fine particles having a negative surface potential in, for example, a microchannel.

Japanese Patent Application Laid-Open (kokai) No. 2009-197097 discloses a method for forming fine particles, including a step of bringing two or more solutions (including a particle formation material solution and a poor solvent solution) into contact with one another in a mixing section of, for example, a microreactor, to thereby form fine particles; a step of bringing a coagulant into contact with the fine particles in a flow channel, to thereby form aggregates; a filtration step; and a step of redispersing the aggregates through pH adjustment, to thereby form fine particles, which method is provided for the purpose of obtaining pigment fine particles having uniform particle size.

SUMMARY OF THE INVENTION

The present invention relates to the following [1] to [8]:

[1] A water dispersion for ink-jet printing comprising chain-like particles each containing anionic organic pigment particles and a cationic polymer, wherein the ratio of organic pigment primary particles forming the chain-like particles to all the pigment primary particles contained in the water dispersion is 10% by number or more.

[2] The water dispersion for ink-jet printing according to [1] above, wherein the anionic organic pigment particles are water-insoluble anionic polymer particles containing an organic pigment (hereinafter may be referred to as "organic-pigment-containing water-insoluble anionic polymer particles").

[3] The water-based ink for ink-jet printing comprising the water dispersion as described in [1] or [2] above.

[4] The method for producing the water dispersion for ink-jet printing as described in [1] above, the method comprising the following steps (I) and (II):

step (I): a step of preparing the mixture containing anionic organic pigment particles, the cationic polymer, and water, and then removing water from the mixture, to thereby prepare a viscous or solid product; and step (II): a step of mixing the thus-prepared viscous or solid product with water, to thereby produce a water dispersion (A).

[5] The method for producing the water dispersion for ink-jet printing as described in [1] above, the method comprising a step of mixing the water dispersion (A) containing anionic organic pigment particles with an aqueous solution (B) containing the cationic polymer in a flow channel having a cross-sectional area of 0.001 to 0.5 mm$^2$ and a length of 0.1 to 10 mm, wherein the water dispersion (A) and the aqueous solution (B) are mixed so that the linear velocity of each of the water dispersion (A) and the aqueous solution (B), as measured at a point in the channel where the water dispersion (A) meets the aqueous solution (B), is 1 m/second or more, and the amount of the cationic groups of the cationic polymer is 5 to 50 mol % with respect to that of the anionic groups of the anionic organic pigment particles.

[6] The method for producing the water dispersion for ink-jet printing as described in [2] above, the method comprising a step of adding the cationic polymer to the water dispersion containing organic-pigment-containing water-insoluble anionic polymer particles, by means of a rotary shear-type stirring apparatus having a rotor-stator structure at a shear speed of 1 m/second or more, wherein the cationic polymer is added to and brought into contact with the water dispersion within a zone defined by a hypothetical hollow cylinder, placed such that the center of the cylinder coincides with the center of the rotary shaft of the rotor and having a circular bottom having a radius twice that of the rotor of the stirring apparatus.

[7] The method for producing the water dispersion for ink-jet printing as described in [2] above, the method comprising the following steps (a) and (b):

step (a): a step of adjusting the pH of the water dispersion containing organic-pigment-containing water-insoluble anionic polymer particles to 8 to 12, and then adding the cationic polymer thereto; and step (b): a step of lowering and adjusting the pH of the water dispersion obtained in step (a) to 7 to 9.

[8] A water-based ink for ink-jet printing comprising the water dispersion for ink-jet printing produced through a production method as described in any of [4] to [7] above.

BRIEF DESCRIPTION OF THE DRAWINGS

FIG. 6(b) is a schematic representation of one example of a Y-shaped microchannel.

DETAILED DESCRIPTION OF THE INVENTION

Figure 1:
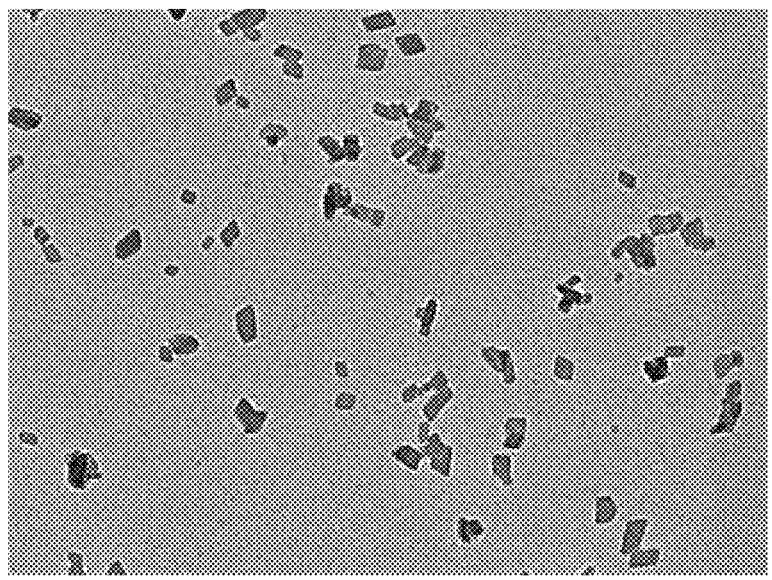
FIG. 1 is a transmission electron microscope (TEM) photograph of organic-pigment-containing anionic polymer particles obtained in Preparation Example 1.

A water-based ink for ink-jet printing containing an organic pigment as a colorant poses a problem in that optical density is insufficient as compared with the case of one containing a dye as a colorant.

An object of the present invention is to provide a water dispersion for ink-jet printing which contains an organic pigment and realizes excellent optical density. Another object of the present invention is to provide a water-based ink containing the water dispersion. Yet another object of the present invention is to provide a method for producing the water dispersion.

The present inventors have conducted studies on the basis of the assumption that difficulty in attaining sufficient optical density by use of an ink for ink-jet printing containing a pigment is attributed to easy permeation of the pigment—which is in the form of fine particles—into a paper sheet. As a result, the present inventors have found that when an ink is produced from anionic organic pigment particles provided in the form of chain-like particles prepared by aggregating the pigment particles with a cationic polymer through ionic interaction, permeation of the ink into the surface of a paper sheet can be suppressed, and optical density can be improved.

Accordingly, the present invention is directed to the following [1] to [8]:

[1] A water dispersion for ink-jet printing containing chain-like particles each containing anionic organic pigment particles and a cationic polymer, wherein the ratio of organic pigment primary particles forming the chain-like particles to all the pigment primary particles contained in the water dispersion is 10% by number or more.

[2] The water dispersion for ink-jet printing according to [1] above, wherein the anionic organic pigment particles are organic-pigment-containing water-insoluble anionic polymer particles.

[3] A water-based ink for ink-jet printing containing the water dispersion as described in [1] or [2] above.

[4] A method for producing the water dispersion for ink-jet printing as described in [1] above, the method containing the following steps (I) and (II):

step (I): a step of preparing a mixture containing anionic organic pigment particles, the cationic polymer, and water, and then removing water from the mixture, to thereby prepare a viscous or solid product; and step (II): a step of mixing the viscous or solid product prepared in step (I) with water, to thereby produce a water dispersion (A).

[5] The method for producing the water dispersion for ink-jet printing as described in [1] above, the method containing a step of mixing the water dispersion (A) containing anionic organic pigment particles with an aqueous solution (B) containing a cationic polymer in a flow channel having a cross-sectional area of 0.001 to 0.5 $mm^2$ and a length of 0.1 to 10 mm, wherein the water dispersion (A) and the aqueous solution (B) are mixed so that the linear velocity of each of the water dispersion (A) and the aqueous solution (B), as measured at a point in the channel where the water dispersion (A) meets the aqueous solution (B), is 1 m/second or more, and the amount of the cationic groups of the cationic polymer is 5 to 50 mol % with respect to that of the anionic groups of the anionic organic pigment particles.

[6] The method for producing the water dispersion for ink-jet printing as described in [2] above, the method containing a step of adding the cationic polymer to the water dispersion containing organic-pigment-containing water-insoluble anionic polymer particles, by means of a rotary shear-type stirring apparatus having a rotor-stator structure at a shear speed of 1 m/second or more, wherein the cationic polymer is added to and brought into contact with the water dispersion within a zone defined by a hypothetical hollow cylinder, placed such that the center of the cylinder coincides with the center of the rotary shaft of the rotor and having a circular bottom having a radius twice that of the rotor of the stirring apparatus.

[7] The method for producing the water dispersion for ink-jet printing as described in [2] above, the method containing the following steps (a) and (b):

step (a): a step of adjusting the pH of the water dispersion containing organic-pigment-containing water-insoluble anionic polymer particles to 8 to 12, and then adding the cationic polymer thereto; and step (b): a step of lowering and adjusting the pH of the water dispersion obtained in step (a) to 7 to 9.

[8] A water-based ink for ink-jet printing containing the water dispersion for ink-jet printing produced through a production method as described in any of [4] to [7] above.

Next will be described components employed in the present invention, as well as steps of the production method of the present invention.

[Anionic Organic Pigment Particles]

The water dispersion for ink-jet printing of the present invention, which contains chain-like particles, employs anionic organic pigment particles as a colorant component.

The anionic organic pigment particles are provided to have a particle size of interest by subjecting the corresponding organic pigment to dispersion treatment, etc.

As used herein, the term "anionic" refers to the case where, when an unneutralized substance is dispersed or dissolved in pure water, the resultant dispersion or solution exhibits a pH of less than 7; or the case where, when an unneutralized substance is insoluble in pure water, and the pH of the dispersion of the substance in pure water cannot be specifically determined, the pure water dispersion product exhibits a negative zeta potential.

The anionic organic pigment particles preferably have an average particle size of 40 to 200 nm, more preferably 50 to 150 nm, much more preferably 60 to 100 nm, from the viewpoint of optical density.

The average particle size of the anionic organic pigment particles is determined through the dynamic light scattering method; specifically, the method described in the Examples hereinbelow.

(Organic Pigment)

No particular limitation is imposed on the organic pigment employed in the anionic organic pigment particles.

When the organic pigment is employed in the water-based ink, preferably, the organic pigment is formed, by use of, for example, a surfactant or a polymer, into fine particles stable in the ink. Particularly preferably, the organic pigment is incorporated into polymer particles, from the viewpoints of dispersion stability, water resistance, etc.

Specific examples of the organic pigment include azo pigments, diazo pigments, phthalocyanine pigments, quinacridone pigments, isoindolinone pigments, dioxazine pigments, perylene pigments, perinone pigments, thioindigo pigments, anthraquinone pigments, and quinophthalone pigments.

No particular limitation is imposed on the hue of the organic pigment employed, and the organic pigment may be a chromatic pigment such as a red organic pigment, a yellow organic pigment, a blue organic pigment, an orange organic pigment, or a green organic pigment.

Specific examples of preferred organic pigments include one or more products with part numbers selected from the group consisting of C.I. Pigment Yellow, C.I. Pigment Red, C.I. Pigment Orange, C.I. Pigment Violet, C.I. Pigment Blue, and C.I. Pigment Green. Of the aforementioned pigments, quinacridone pigments are preferably employed, from the viewpoint of color property.

(Solid Solution Pigment)

The present invention may employ a suitable solid solution pigment containing dichloroquinacridone.

Dichloroquinacridone is employed from the viewpoint of color development, since, when the compound is employed as one component in a solid solution pigment, the compound exhibits the effect of improving the transparency or chroma of the solid solution pigment itself through change in electronic state derived from the chlorine groups of the compound.

Examples of dichloroquinacridone compounds include 2,9-dichloroquinacridone, 3,10-dichloroquinacridone, and 4,11-dichloroquinacridone.

Examples of the pigment which forms a solid solution with dichloroquinacridone include non-substituted quinacridone such as β-quinacridone or γ-quinacridone, and dimethylquinacridone.

The solid solution pigment is more preferably a solid solution pigment formed of combination of 2,9-dichloroquinacridone (C.I. Pigment Red 202) and non-substituted quinacridone (C.I. Pigment Violet 19).

The dichloroquinacridone content of the solid solution pigment is preferably 5 to 95% by weight, more preferably 10 to 90% by weight, much more preferably 15 to 85% by weight.

The aforementioned solid solution pigments may be employed singly, or in combination of two or more species in any proportion. The solid solution pigment may be employed in combination with another colorant, e.g., pigment, so long as the effects of the present invention are not impaired.

(Self-Dispersible Organic Pigment)

The present invention may employ a self-dispersible organic pigment. As used herein, "self-dispersible organic pigment" refers to an organic pigment which has one or more hydrophilic functional groups (e.g., an anionic hydrophilic group such as a carboxy group or a sulfonate group, or a cationic hydrophilic group such as a quaternary ammonium group) that are bonded, directly or via an additional atomic group, to the surface of the organic pigment, and which can be dispersed in an aqueous medium without use of a surfactant or a resin. Examples of the "additional atomic group" include a C1 to C12 alkanediyl group, a phenylene group, and a naphthylene group. When the self-dispersible organic pigment is employed in anionic pigment particles, the hydrophilic functional group is preferably an anionic hydrophilic group such as a carboxy group or a sulfonate group. When an organic pigment is transformed into a self-dispersible organic pigment, for example, a required amount of a hydrophilic functional group is chemically bonded to the surface of the organic pigment through a customary method.

No particular limitation is imposed on the amount of the hydrophilic functional group, but the amount is preferably 100 to 3.000 µmol on the basis of 1 g of the self-dispersible organic pigment. When the hydrophilic functional group is a carboxy group, the amount thereof is preferably 200 to 700 µmol on the basis of 1 g of the self-dispersible organic pigment.

The aforementioned organic pigments may be employed singly, or in combination of two or more species in any proportion.

[Organic-Pigment-Containing Water-Insoluble Anionic Polymer Particles]

No particular limitation is imposed on the anionic organic pigment particles, but the pigment particles are preferably anionic polymer particles containing a self-dispersible organic pigment or an organic pigment. From the viewpoint of improvement in optical density of a printed image provided by the water dispersion or the ink, the anionic organic pigment particles are more preferably organic-pigment-containing water-insoluble anionic polymer particles (hereinafter may be referred to as "organic-pigment-containing anionic polymer particles" or may be referred to simply as "anionic polymer particles").

As used herein, the term "water-insoluble polymer" refers to a polymer which, when dried to constant mass at 105° C. for two hours, dissolves in an amount of 10 g or less in 100 g of water at 25° C. The amount of a water-insoluble polymer dissolved in 100 g of water at 25° C. is preferably 5 g or less, more preferably 1 g or less. The amount of an anionic polymer dissolved in water corresponds to that as determined when the anionic groups of the polymer are 100% neutralized with sodium hydroxide.

Examples of the employable polymer include polyester, polyurethane, and vinyl polymers. Preferred is an anionic vinyl polymer produced through addition polymerization of a vinyl monomer (vinyl compound, vinylidene compound, or vinylene compound), from the viewpoint of storage stability of the water dispersion or the ink.

The anionic vinyl polymer is preferably a vinyl polymer produced through copolymerization of a mixture containing (a) an anionic monomer (hereinafter may be referred to as "component (a)"), and (b) a macromer (hereinafter may be referred to as "component (b)") and/or (c) a hydrophobic monomer (hereinafter may be referred to as "component (c)") (hereinafter the mixture may be referred to simply as "monomer mixture"). The vinyl polymer includes a structural unit derived from component (a), and a structural unit derived from component (b) and/or a structural unit derived from component (c). Particularly preferably, the vinyl polymer includes all the structural units derived from component (a), component (b), and component (c).

[Anionic Monomer (a)]

The anionic monomer (a) is employed as a monomer component of the anionic polymer, from the viewpoint of reliably dispersing organic-pigment-containing water-insoluble anionic polymer particles in the water dispersion or the ink, as well as the viewpoint of promoting ionic interaction between the anionic polymer particles and a cationic polymer.

Examples of the anionic monomer include a carboxylic acid monomer, a sulfonic acid monomer, and a phosphoric acid monomer.

Examples of the carboxylic acid monomer include acrylic acid, methacrylic acid, crotonic acid, itaconic acid, maleic acid, fumaric acid, citraconic acid, and 2-methacryloyloxymethylsuccinic acid.

Examples of the sulfonic acid monomer include styrenesulfonic acid, 2-acrylamido-2-methylpropanesulfonic acid, 3-sulfopropyl(meth)acrylate, and bis-(3-sulfopropyl)-itaconic acid ester.

Examples of the phosphoric acid monomer include vinylphosphonic acid, vinyl phosphate, bis(methacryloxyethyl) phosphate, diphenyl-2-acryloyloxyethyl phosphate, diphenyl-2-methacryloyloxyethyl phosphate, and dibutyl-2-acryloyloxyethyl phosphate.

Of the aforementioned anionic monomers, a carboxylic acid monomer is preferred, with acrylic acid or methacrylic acid being more preferred, from the viewpoint of dispersion stability of the anionic polymer particles or the resultant chain-like particles in the water dispersion or the ink.

[Macromer (b)]

The macromer (b) is a compound having a polymerizable functional group at one terminal end thereof and having a number average molecular weight of 500 to 100,000. The macromer (b) is employed as a monomer component of the anionic polymer, from the viewpoint of storage stability of the water-insoluble anionic polymer particles and the chain-like particles containing the polymer particles in the water dispersion or the water-based ink. The polymerizable functional group at one terminal end of the macromer is preferably an acryloyloxy group or a methacryloyloxy group, more preferably a methacryloyloxy group.

The macromer (b) preferably has a number average molecular weight of 500 to 100,000, more preferably 1,000 to 10,000. The number average molecular weight of the macromer is determined through gel chromatography using, as a solvent, chloroform containing 1 mmol/L dodecyldimethylamine and using polystyrene as a standard substance.

The macromer (b) is preferably a styrenic macromer, an aromatic-group-containing (meth)acrylate macromer, or a silicone macromer, from the viewpoint of dispersion stability of the anionic polymer particles and the chain-like particles in the water dispersion or the ink.

Examples of the styrenic macromer include a homopolymer of a styrenic monomer, and a copolymer of a styrenic monomer and an additional monomer. When the styrenic macromer is the copolymer, the styrenic monomer content of the copolymer is preferably 50% by weight or more, more preferably 70% by weight or more, from the viewpoint of dispersion stability of the anionic polymer particles and the chain-like particles in the water dispersion or the ink. Examples of the styrenic monomer include styrene, 2-methylstyrene, vinyltoluene, ethylvinylbenzene, vinylnaphthalene, and chlorostyrene. Examples of the additional monomer copolymerized include aromatic-group-containing (meth)acrylate and acrylonitrile. Specific examples of the styrenic macromer include AS-6(S), AN-6(S), and HS-6(S) (trade name, Toagosei Co., Ltd.).

Examples of the aromatic-group-containing (meth)acrylate macromer include a homopolymer of an aromatic-group-containing (meth)acrylate monomer, and a copolymer of an aromatic-group-containing (meth)acrylate monomer and an additional monomer. When the aromatic-group-containing (meth)acrylate macromer is the copolymer, the aromatic-group-containing (meth)acrylate monomer content of the copolymer is preferably 50% by weight or more, more preferably 70% by weight or more, from the viewpoint of dispersion stability of the anionic polymer particles and the chain-like particles in the water dispersion or the ink.

Examples of the aromatic-group-containing (meth)acrylate include (meth)acrylates having a C7 to C22 arylalkyl group optionally having a heteroatom-containing substituent, and (meth)acrylates having a C6 to C22 aryl group optionally having a heteroatom-containing substituent. Specific examples of the (meth)acrylate monomer include benzyl (meth)acrylate, phenoxyethyl (meth)acrylate, 2-hydroxy-3-phenoxypropyl acrylate, and 2-methacryloyloxyethyl-2-hydroxypropyl phthalate. Preferred is benzyl(meth)acrylate. Examples of the additional monomer copolymerized include a styrenic monomer and acrylonitrile.

The macromer (b) may be a silicone macromer. Examples of the silicone macromer include organopolysiloxanes each having a polymerizable functional group at one terminal end thereof.

[Hydrophobic Monomer (c)]

The hydrophobic monomer (c) is employed as a monomer component of the anionic polymer, from the viewpoint of improvement in optical density of a printed image provided by the water dispersion or the ink. Examples of the hydrophobic monomer include an alkyl (meth)acrylate and an aromatic-group-containing monomer.

The alkyl (meth)acrylate is preferably one having a C1 to C22 alkyl group, more preferably, a C6 to C18 alkyl group. Examples of the alkyl (meth)acrylate include methyl (meth)acrylate, ethyl (meth)acrylate, (iso)propyl (meth)acrylate, (iso- or tertiary-)butyl (meth)acrylate, (iso)amyl (meth)acrylate, cyclohexyl (meth)acrylate, 2-ethylhexyl (meth)acrylate, (iso)octyl (meth)acrylate, (iso)decyl (meth)acrylate, (iso)dodecyl (meth)acrylate, and (iso)stearyl (meth)acrylate.

As used herein, "(iso- or tertiary-)" or "(iso)" refers to the corresponding iso- or tertiary- or iso group, and also to the corresponding normal group. As used herein, "(meth)acrylate" refers to acrylate and/or methacrylate.

The aromatic-group-containing monomer is preferably a vinyl monomer having a C6 to C22 aromatic group optionally having a heteroatom-containing substituent, more preferably a styrenic monomer or an aromatic-group-containing (meth)acrylate. Preferably, these monomers are employed in combination.

The styrenic monomer is preferably styrene, 2-methylstyrene, or divinylbenzene, more preferably styrene.

The aromatic-group-containing (meth)acrylate is preferably, for example, benzyl (meth)acrylate or phenoxyethyl (meth)acrylate, more preferably benzyl methacrylate and/or benzyl acrylate.

[Nonionic Monomer (d)]

The monomer mixture may also contain a nonionic monomer (d) (hereinafter may be referred to as "component (d)").

Examples of component (d) include 2-hydroxyethyl (meth)acrylate, 3-hydroxypropyl (meth)acrylate, polyethylene glycol (n=2 to 30, "n" represents the average amount by mole of added oxyalkylene groups (the same shall apply hereinafter)) (meth)acrylate, polypropylene glycol (n=2 to 30) (meth)acrylate, poly(ethylene glycol (n=1 to 15)-propylene glycol (n=1 to 15)) (meth)acrylate, methoxypolyethylene glycol (1 to 30) (meth)acrylate, methoxypolytetramethylene glycol (1 to 30) (meth)acrylate, ethoxypolyethylene glycol (1 to 30) (meth)acrylate, octoxypolyethylene glycol (1 to 30) (meth)acrylate, polyethylene glycol (1 to 30) (meth)acrylate 2-ethylhexyl ether, (iso)propoxypolyethylene glycol (1 to 30) (meth)acrylate, butoxypolyethylene glycol (1 to 30) (meth)acrylate, methoxypolypropylene glycol (1 to 30) (meth)acrylate, methoxy(ethylene glycol-propylene glycol copolymer) (1 to 30, wherein the number of ethylene glycol units is 1 to 29) (meth)acrylate, and phenoxy(ethylene glycol-propylene glycol copolymer) (1 to 30, wherein the number of ethylene glycol units is 1 to 29) (meth)acrylate.

Specific examples of commercially available component (d) include NK Ester M-20G, NK Ester M-40G, NK Ester M-90G, and NK Ester M-230G (products of Shin-Nakamura Chemical Co., Ltd.); and Blemmer PE-90, Blemmer PE-200, Blemmer PE-350, Blemmer PME-100, Blemmer PME-200, Blemmer PME-400, Blemmer PME-1000, Blemmer PP-500, Blemmer PP-800, Blemmer PP-1000, Blemmer AP-150, Blemmer AP-400, Blemmer AP-550, Blemmer AP-800, Blemmer 50PEP-300, Blemmer 50POEP-800B, and Blemmer 43PAPE-600B (products of NOF Corporation).

The aforementioned components (a) to (d) may be employed singly or in combination of two or more species.

Next will be described the amount of each of the aforementioned components (a) to (c) (corresponding to the amount of unneutralized component (the same shall apply hereinafter)) contained in the monomer mixture upon production of the anionic polymer; or the amount of a structural unit derived from each of components (a) to (c) contained in the anionic polymer.

The amount of component (a) is preferably 3 to 40% by weight, more preferably 4 to 30% by weight, particularly preferably 5 to 25% by weight, from the viewpoint of reliably dispersing the pigment-containing anionic polymer particles and the resultant chain-like particles in the water dispersion or the ink, as well as the viewpoint of promoting ionic interaction between the anionic polymer particles and a cationic polymer.

The amount of component (b) is preferably 1 to 25% by weight, more preferably 5 to 20% by weight, from the viewpoint of dispersion stability of the pigment-containing anionic polymer particles and the resultant chain-like particles in the water dispersion or the ink.

The amount of component (c) is preferably 5 to 98% by weight, more preferably 10 to 80% by weight, from the viewpoint of improvement in optical density of a printed image provided by the water dispersion or the ink.

The ratio by weight of component (a) to [component (b)+component (c)] is preferably 0.01 to 1, more preferably 0.02 to 0.67, much more preferably 0.03 to 0.50, from the viewpoints of dispersion stability of the pigment-containing anionic polymer particles and the resultant chain-like particles in the water dispersion or the ink, as well as optical density of a printed image provided by the water dispersion or the ink.

The polymer forming the anionic polymer particles preferably includes a structural unit derived from benzyl methacrylate and/or benzyl acrylate (i.e., component (c)) in an amount of 30 to 80% by weight, more preferably 40 to 80% by weight, much more preferably 50 to 75% by weight, particularly preferably 60 to 75% by weight, from the viewpoints of chroma, storage stability, and optical density.

The anionic polymer particles are preferably formed of structural units derived from monomers having the same polymerizable group, from the viewpoints of optical density and storage stability. The same polymerizable group is more preferably a methacryloyl group. Conceivably, the reason for this is attributed to the fact that since monomers having the same polymerizable group exhibit generally the same polymerization rate, the resultant polymer molecule has uniform composition, and the monomers can be incorporated into the polymer molecule in proportions as desired.

In the present invention, both optical density and storage stability can be improved, which is considered to be attributed to the fact that adsorption of the anionic polymer particles to a solid solution pigment is enhanced by virtue of the structural unit derived from benzyl methacrylate and/or benzyl acrylate, as well as interaction between the anionic polymer particles and a cationic polymer is promoted by virtue of the anionic groups of the polymer particles.

(Production of Anionic Polymer)

The aforementioned anionic polymer is produced by copolymerization of the monomer mixture through any known polymerization technique, such as bulk polymerization, solution polymerization, suspension polymerization, or emulsion polymerization. Of these polymerization techniques, solution polymerization is preferably employed.

The solvent employed in solution polymerization is preferably a polar organic solvent. When a water-miscible polar organic solvent is employed, the organic solvent may be mixed with water. Examples of the polar organic solvent include C1 to C3 aliphatic alcohols such as methanol, ethanol, and propanol; ketones such as acetone and methyl ethyl ketone; and esters such as ethyl acetate. Of these, preferred is methanol, ethanol, acetone, methyl ethyl ketone, or a solvent mixture of water and one or more species of these organic solvents.

For polymerization, there may be employed any known radical polymerization initiator; for example, an azo compound such as 2,2'-azobisisobutyronitrile or 2,2'-azobis(2,4-dimethylvaleronitrile), or an organic peroxide such as t-butyl peroxyoctoate or dibenzoyl peroxide. The amount of a radical polymerization initiator employed is preferably 0.001 to 5 mol, more preferably 0.01 to 2 mol, on the basis of 1 mol of the monomer mixture (i.e., the total amount (1 mol) of the monomers).

For polymerization, there may also be added any known chain transfer agent, such as a mercaptan (e.g., octyl mercaptan or 2-mercaptoethanol) or thiuram disulfide.

The polymerization conditions of the monomer mixture vary with, for example, the type of the radical polymerization initiator, monomers, or solvent employed, and cannot be unequivocally determined. However, generally, the polymerization temperature is preferably 30 to 100° C., more preferably 50 to 80° C., and the polymerization time is preferably 1 to 20 hours. Preferably, polymerization is carried out in a nitrogen gas atmosphere or an atmosphere of inert gas such as argon.

After completion of polymerization reaction, the thus-produced polymer may be isolated from the reaction mixture through any known technique such as reprecipitation or solvent removal through evaporation. Unreacted monomer, etc. may be removed by subjecting the thus-produced polymer to, for example, reprecipitation, membrane filtration, chromatography, or extraction.

The anionic polymer employed in the present invention preferably has a weight average molecular weight of 5,000 to 500,000, more preferably 10,000 to 400,000, still more preferably 10,000 to 300,000, much more preferably 20,000 to 200,000, from the viewpoints of dispersion stability of the pigment-containing water-insoluble anionic polymer particles and the chain-like particles containing the polymer particles in the water dispersion or the water-based ink, as well as optical density of a printed image provided by the water dispersion or the water-based ink. The weight average molecular weight of the polymer was determined through the method described in the Examples hereinbelow.

In the pigment-containing water-insoluble anionic polymer employed in the present invention, preferably, the anionic groups derived from the anionic monomer (a) are neutralized with a neutralizing agent. Examples of the neutralizing agent include bases such as lithium hydroxide, sodium hydroxide, potassium hydroxide, and amines.

The degree of neutralization of the anionic groups of the anionic polymer is preferably 10 to 300%, more preferably 20 to 200%, much more preferably 30 to 150%, from the viewpoint of dispersion stability.

In the case where the anionic polymer is cross-linked, the neutralization degree of the anionic groups of the polymer before cross-linking is preferably 10 to 90%, more preferably 20 to 80%, much more preferably 30 to 70%, from the viewpoints of dispersion stability and cross-linking efficiency.

The neutralization degree can be determined by use of the following formula:

{[the weight of a neutralizing agent (g)/the equivalent of the neutralizing agent]/[the acid value of the polymer (mg KOH/g)×the weight of the polymer (g)/(56×1000)]}×100.

The acid value of the polymer may be calculated on the basis of the structural units of the polymer. Alternatively, the acid value may be determined by dissolving the polymer in an appropriate solvent (e.g., methyl ethyl ketone), followed by titration.

[Production of Organic-Pigment-Containing Anionic Polymer Particles]

The water dispersion of organic-pigment-containing anionic polymer particles can be effectively produced through a method including the following steps (1) and (2):

step (1): a step of subjecting a mixture containing an anionic polymer, an organic solvent, an organic pigment, and water to dispersion treatment, to thereby prepare a dispersion of organic-pigment-containing anionic polymer particles; and step (2): a step of removing the organic solvent from the dispersion prepared in step (1), to thereby produce a water dispersion of organic-pigment-containing water-insoluble anionic polymer particles.

Step (1)

Preferably, in step (1), firstly, an anionic polymer is dissolved in an organic solvent, and subsequently an organic pigment and water (and optionally a neutralizing agent, a surfactant, etc.) are added to and mixed with the resultant organic solvent solution, to thereby produce an oil-in-water dispersion. No particular limitation is imposed on the order of addition of components to the organic solvent solution of the anionic polymer. However, preferably, the neutralizing agent, water, and the organic pigment are added to the solution in this order.

In the resultant mixture, the amount of the organic pigment is preferably 5 to 50% by weight, more preferably 10 to 40% by weight; the amount of the organic solvent is preferably 10 to 70% by weight, more preferably 10 to 50% by weight; the amount of the anionic polymer is preferably 2 to 40% by weight, more preferably 3 to 20% by weight; and the amount of water is preferably 10 to 70% by weight, more preferably 20 to 70% by weight.

The ratio by weight of the amount of the organic pigment to that of the anionic polymer; i.e., [organic pigment/anionic polymer], is preferably 50/50 to 90/10, more preferably 70/30 to 85/15, from the viewpoint of dispersion stability.

When a neutralizing agent is employed, preferably, neutralization is carried out so that the finally produced water dispersion exhibits a pH of 7 to 11. Examples of the neutralizing agent include bases such as lithium hydroxide, sodium hydroxide, potassium hydroxide, and amines. The anionic polymer may be neutralized in advance.

Examples of the organic solvent employed include alcohol solvents such as ethanol, isopropanol, and isobutanol; ketone solvents such as acetone, methyl ethyl ketone, methyl isobutyl ketone, and diethyl ketone; and ether solvents such as dibutyl ether, tetrahydrofuran, and dioxane. These solvents may be employed singly or in combination of two or more species.

The amount of such an organic solvent dissolved in 100 g of water at 20° C. is preferably 5 g or more, more preferably 10 g or more. The organic solvent employed is preferably methyl ethyl ketone or methyl isobutyl ketone.

No particular limitation is imposed on the method for dispersing the mixture in step (1). The pigment-containing anionic polymer particles may be formed into fine particles having a desired average particle size only through a main dispersion process. However, preferably, the mixture is subjected to a preliminary dispersion process and then to the main dispersion process under application of shear stress, so that the pigment-containing anionic polymer particles have a desired average particle size. Dispersion in step (1) is preferably carried out at 0 to 40° C., more preferably at 5 to 30° C. The dispersion time is preferably 1 to 30 hours, more preferably 2 to 25 hours.

Preliminary dispersion of the mixture is carried out by means of a generally used mixing/stirring device, such as an anchor blade or a disper blade. Specific examples of preferred mixing/stirring apparatuses include high-speed stirring/mixing apparatuses, such as Ultra Disper and Despa Mill (trade name, Asada Iron Works Co., Ltd.); Milder (trade name, Ebara Corporation and Pacific Machinery & Engineering Co., Ltd.); and T.K. Homo Mixer, T.K. Pipeline Mixer, T.K. Homo Jetter, T.K. Homomic Line Flow, and Filmix (trade name, Primix Corporation).

Examples of the means for application of shear stress in the main dispersion process include kneading machines such as a roll mill, a kneader, and an extruder; homo-valve-type high-pressure homogenizers such as High-Pressure Homogenizer (trade name, Izumi Food Machinery Co., Ltd.); chamber-type high-pressure homogenizers such as Micro Fluidizer (trade name, Microfluidics Inc.), Nanomizer (trade name, Yoshida Kikai Co., Ltd.), and Altimizer and Starburst (trade name, Sugino Machine Limited); and media dispersers such as a paint shaker and a bead mill. Examples of commercially available media dispersers include Ultra Apex Mill (trade name, Kotobuki Industries Co., Ltd.), Pico Mill (trade name, Asada Iron Works Co., Ltd.), and Dyno-Mill (trade name, Shinmaru Enterprises Corporation). A plurality of these apparatuses may be employed in combination. Among these apparatuses, preferably, a media disperser and a high-pressure homogenizer are employed in combination, from the viewpoint of reduction in particle size of the organic-pigment-containing anionic polymer particles.

Step (2)

In step (2), the organic solvent is removed through evaporation, by a known method, from the above-produced dispersion, to thereby produce a water dispersion of the organic-pigment-containing anionic polymer particles. Preferably, the organic solvent is substantially completely removed from the thus-obtained water dispersion containing the pigment-containing anionic polymer particles. However, the organic solvent may remain in the water dispersion, so long as the effects of the present invention are not impaired. When cross-linking is carried out after this step, the organic solvent may optionally be further removed after cross-linking. The amount of the residual organic solvent is preferably 0.1% by weight or less, more preferably 0.01% by weight or less.

Optionally, the dispersion may be thermally treated under stirring before removal of the organic solvent through evaporation.

In the thus-produced water dispersion of the organic-pigment-containing anionic polymer particles, solid particles of the organic-pigment-containing anionic polymer are dispersed in water serving as a main medium. No particular limitation is imposed on the form of the polymer particles, so long as the organic pigment and the anionic polymer form particles. Examples of the form of the anionic polymer particles include particles of the anionic polymer into which the organic pigment has been incorporated; particles of the anionic polymer in which the organic pigment is uniformly dispersed; particles of the anionic polymer on which the organic pigment is exposed; and a mixture of these particle forms.

[Cationic Polymer]

The water dispersion for ink-jet printing of the present invention employs chain-like particles containing the aforementioned anionic organic pigment particles and a cationic polymer, from the viewpoint of improvement in optical density.

As used herein, the term "cationic" refers to the case where, when an unneutralized polymer is dispersed or dissolved in pure water, the resultant dispersion or solution exhibits a pH of greater than 7; the case where, when a polymer having, for example, a quaternary ammonium salt moiety (counter ion: hydroxide ion) is dispersed or dissolved in pure water, the resultant dispersion or solution exhibits a pH of greater than 7; or the case where, when an unneutralized polymer or the like is insoluble in pure water, and the pH of the dispersion of the polymer or the like in pure water cannot be specifically determined, the pure water dispersion product exhibits a positive zeta potential.

The cationic polymer employed is preferably a water-soluble cationic polymer, from the viewpoints of effective interaction with the organic-pigment-containing anionic polymer particles, as well as improvement in optical density of a printed image provided by the water dispersion or the ink. As used herein, the term "water-soluble cationic polymer" refers to a cationic polymer which, when dried to constant mass at 105° C. for two hours, dissolves in an amount of more than 10 g in 100 g of water at 25° C. The amount of a water-soluble cationic polymer dissolved in 100 g of water at 25° C. is preferably 20 g or more, more preferably 100 g or more.

The reason why optical density is improved by incorporating a water-soluble cationic polymer into the water dispersion for ink-jet printing of the present invention has not been elucidated. However, conceivably, improvement in optical density is attributed to the fact that ionic interaction occurs between the water-soluble cationic polymer and the organic-pigment-containing anionic polymer particles on a medium (in particular, a paper sheet) after printing, and the organic pigment remains on the surface of the medium without permeation of the organic-pigment-containing anionic polymer particles into the medium. When such interaction is strong, conceivably, a plurality of polymer particles form chain-like secondary particles in the water dispersion, and the particles are likely to be trapped (i.e., high physical resistance) by the fibrous structure of the paper sheet as a medium. Therefore, a large amount of the organic pigment remains on the surface of the medium, and thus optical density is improved.

The water-soluble cationic polymer preferably has a number average molecular weight of 1,000 to 300,000, more preferably 10,000 to 80,000, from the viewpoint of optical density.

The cationic polymer is preferably a polymer having a cationic group such as a primary, secondary, or tertiary amino group, an imino group, a quaternary ammonium salt group, or a hydrazine group, more preferably a polymer having an amino group and/or an imino group, much more preferably a polymer having an amino group, from the viewpoint of improvement in optical density of a printed image provided by the water dispersion or the ink containing the water dispersion. The cationic polymer is preferably a homopolymer of a monomer having a cationic group, or a product obtained through copolymerization or condensation polymerization between such a cationic monomer and an additional monomer.

Specific examples of the cationic polymer include polyethyleneimine, polyallylamine, polyvinylamine, polyvinylpyridine, polyethyleneimine-epichlorohydrine reaction products, polyamide-polyamine resins, polyamide-epichlorohydrine resins, chitosan compounds, cationized starch, polyaminesulfone, polyvinylimidazole, polyamidine, dicyanamide-polyalkylene polyamine condensation products, polyalkylene polyamine-dicyandiamide ammonium salt condensation products, dicyandiamide-formalin condensation products, polymers and copolymers of diallyldimethylammonium chloride, vinylpyrrolidone-vinylimidazole copolymers, polymers and copolymers of vinylbenzyltrimethylammonium chloride, polymers and copolymers of dimethylaminoethyl (meth)acrylate, polymers and copolymers of (meth)acryloyloxyalkyltrialkylammonium chloride, polymers and copolymers of (meth)acryloyloxyalkyldialkylbenzylammonium chloride, and acid neutralization products thereof.

Examples of preferred cationic polymers having an amino group include polyethyleneimine, polyallylamine, and polyvinylamine. The cationic polymer is more preferably polyethyleneimine or polyallylamine, much more preferably polyethylene imine.

The aforementioned cationic polymers may be employed singly or in combination of two or more species.

(Polyethyleneimine)

Polyethyleneimine is a water-soluble polymer compound represented by the formula —$(CH_2CH_2NH)_n$— and including ethyleneimine units polymerized in a linear, branched, or network form. When incorporated into the water dispersion, polyethyleneimine acts as a polycation. When the pH of the water dispersion containing polyethyleneimine is adjusted to 7 to 9, conceivably, polyethyleneimine interacts with the anionic groups of the organic-pigment-containing polymer particles, to thereby promote aggregation between a plurality of polymer particles by ionic interaction, and to suppress permeation of the ink into a paper sheet, whereby optical density is improved. It is also considered that since polyethyleneimine acts as a polycation, polyethyleneimine is likely to be adsorbed onto the surfaces of the polymer particles, and only a small amount of polyethyleneimine is dissolved in the water dispersion or the ink. Therefore, conceivably, the water dispersion or the ink exhibits excellent dispersion stability, filterability, and storage stability.

The polyethyleneimine employed preferably has a number average molecular weight (as determined through ebullioscopy) of 300 to 300,000, more preferably 300 to 100,000, much more preferably 400 to 80,000, particularly preferably 500 to 70,000. When the number average molecular weight is 300 or more, fixation of the pigment onto the surface of a paper sheet to be printed is improved, and a high effect of improving optical density is attained, whereas when the number average molecular weight is 100,000 or less, the water dispersion or the ink exhibits low viscosity and excellent dispersion stability.

No particular limitation is imposed on the method for producing polyethyleneimine, and polyethyleneimine may be produced through a known polymerization method. Examples of the production method include [1] ring-opening polymerization of ethyleneimine in the presence of, for example, carbon dioxide, hydrochloric acid, or hydrobromic acid serving as a catalyst; [2] polycondensation between ethylene chloride and ethylenediamine; and [3] heating of oxazolidone-2.

In the present invention, polyethyleneimine compounds may be employed singly or in combination of two or more species.

The amount of the cationic polymer (in particular, polyethyleneimine) contained in the water dispersion is preferably 0.01 to 10% by weight, more preferably 0.03 to 3% by weight, much more preferably 0.05 to 2% by weight, particularly preferably 0.1 to 1% by weight with respect to the anionic organic pigment particles, from the viewpoint of balance between the basic properties of the ink and improvement in optical density.

[Chain-Like Particles]

The chain-like particles employed in the present invention each contain the anionic organic pigment particles and the cationic polymer, wherein, conceivably, the anionic organic pigment particles are bonded together by means of the cationic polymer through electrical interaction between the anionic organic pigment particles and the cationic polymer.

The reason why the optical density of a printed image provided by the water dispersion or ink containing the chain-like particles is improved has not been elucidated. However, conceivably, when the water dispersion or ink containing the chain-like particles is applied to a paper sheet, the chain-like particles exhibit high physical resistance to the fibrous structure of the paper sheet, and the organic pigment is likely to remain on the surface of the sheet, which phenomenon differs from that in the case where an ink containing organic pigment particles or aggregated particles (lumps) is applied onto a paper sheet in such a case, the particles permeate the fibrous structure of the paper sheet together with the solvent of the ink after application of ink droplets onto the sheet, whereby optical density is lowered.

The form of the chain-like particles can be observed under a transmission electron microscope (TEM). When the organic-pigment-containing anionic polymer particles are observed under a TEM, substantially, only the organic pigment can be observed, since the polymer is less likely to be seen.

The "chain-like particles" employed in the present invention are composed of pigment primary particles bonded together in, for example, a linear-chain, bending, branched-chain, or circular form. More specifically, the chain-like particles employed in the present invention have a percent area of secondary particle as determined by the following formula (I) of less than 40%.

The percent area of secondary particle is determined as follows. A circumscribed circle is drawn around one independent secondary particle observed in a TEM photograph, and the area of the circle (A0 (nm$^2$)) is determined. Subsequently, the total area (A1 (nm$^2$)) of pigment primary particles forming the secondary particle (each primary particle having a quadrangular shape as observed in the TEM photograph) is determined. The proportion of the region of the secondary particle in the circumscribed circle; i.e., the percent area of secondary particle is determined by the following formula (I):

$$\text{percent area of secondary particle (\%)} = (A1/A0) \times 100 \quad \text{(I)}.$$

When the secondary particle is in a linear-chain form, the percent area thereof in the circumscribed circle is the minimum, whereas when the secondary particle is in a lump form, the percent area thereof in the circumscribed circle is the maximum.

The secondary particles formed through bonding of the anionic organic pigment particles by means of the cationic polymer contain the aforementioned chain-like particles. Generally, attributed to the degree of bonding of the pigment particles, the chain-like particles include particles of various forms; for example, particles having a very long chain form, and particles maintaining the form of pigment primary particles.

The ratio (% by number) of pigment primary particles forming the chain-like particles to all the pigment primary particles contained in the water dispersion of the present invention (hereinafter the ratio may be referred to as the "ratio of chain-like particles") is 10% by number or more, preferably 20% by number or more, more preferably 30% by number or more, much more preferably 50% by number or more, from the viewpoint of improvement in optical density.

The ratio of chain-like particles (% by number) is determined as follows. Firstly, the number (N0) of 100 or more pigment primary particles forming secondary particles is counted through observation under an electron microscope. Among all the counted pigment primary particles, the number (N1) of pigment primary particles forming chain-like particles is counted. The ratio of chain-like particles (% by number) is determined by the following formula (II):

$$\text{ratio of chain-like particles (\% by number)} = (N1/N0) \times 100 \quad \text{(II)}.$$

The chain-like particles preferably have an average particle size of 70 to 400 nm, more preferably 90 to 300 nm, still more preferably 120 to 250 nm, much more preferably 150 to 200 nm, from the viewpoint of improvement in optical density.

The ratio of the average particle size of the particles contained in the water dispersion containing the aforementioned chain-like particles to that of the anionic organic pigment particles (average particle size of the particles contained in the water dispersion containing the chain-like particles/average particle size of the anionic organic pigment particles) is preferably 1.5 to 5.0, more preferably 1.5 to 4.0, much more preferably 1.5 to 3.0.

The average particle size of the particles contained in the water dispersion containing the aforementioned chain-like particles corresponds to the average particle size of all the particles including, for example, secondary particles other than the chain-like particles.

The aforementioned average particle size is determined through the dynamic light scattering method; specifically, the method described in the Examples hereinbelow.

[Production Method 1 for Water Dispersion for Ink-Jet Printing]

No particular limitation is imposed on the method for producing the water dispersion for ink-jet printing of the present invention, but the water dispersion is preferably produced through the production method including the following steps (I) and (II):

step (I): a step of preparing a mixture containing anionic organic pigment particles, a cationic polymer, and water, and then removing water from the mixture, to thereby prepare a viscous or solid product; and step (II): a step of mixing the viscous or solid product prepared in step (I) with water, to thereby produce a water dispersion (A).

More preferably, the water dispersion for ink-jet printing of the present invention is produced through the method further including the following step (III):

step (III): a step of mixing the water dispersion (A) produced in step (II) with a cross-linking agent, and subjecting the resultant mixture to cross-linking treatment, to thereby produce a water dispersion (B).

(Step (I))

In step (I), a mixture containing anionic organic pigment particles (in particular, organic-pigment-containing anionic polymer particles) is prepared through, for example, the aforementioned production method, a cationic polymer, and water. Thereafter, water is removed from the mixture, to thereby prepare a viscous or solid product.

As used herein, the term "viscous product" refers to a muddy or viscid product, and the term "solid product" refers to a product which is in the form of, for example, block having no fluidity at 25° C.

In step (I), a mixture containing the anionic organic pigment particles, the cationic polymer, and water is prepared through, for example, any of the following processes: (i) a process in which the cationic polymer or an aqueous solution of the cationic polymer is added to a water dispersion of the anionic organic pigment particles; (ii) a process in which a water dispersion of the anionic organic pigment particles is added to the cationic polymer or an aqueous solution of the cationic polymer; and (iii) a process in which the cationic polymer is added to a water dispersion of the anionic organic pigment particles, and then the water dispersion is further added to the resultant mixture. The aforementioned aqueous solution or water dispersion may be added a plurality of times in a divided manner. Of these processes, process (iii) is preferably employed.

The ratio by weight of the anionic organic pigment particles to the cationic polymer employed in this step; i.e., [anionic organic pigment particles/cationic polymer], is preferably 40 to 5,000, more preferably 80 to 2,000, much more preferably 100 to 1,000, from the viewpoint of improvement in optical density of a printed image provided by the water dispersion.

Removal of water may be carried out through evaporation of water by, for example, the reduced pressure method or the heating method. Preferably, the heating method is employed. The heating temperature is preferably 50 to 100° C., more preferably 60 to 90° C., much more preferably 70 to 85° C.

Evaporation is carried out until a viscous product or a solid product is prepared. From the viewpoint of attaining uniform particle size through the dispersion treatment in step (II), preferably, a viscous product is prepared. The solid content of the thus-prepared viscous or solid product is preferably 40 to 90% by weight, more preferably 45 to 80% by weight, much more preferably 50 to 70% by weight.

(Step (II))

In step (II), the viscous or solid product prepared in step (I) is mixed with water, to thereby produce a water dispersion (A).

The ratio by weight of water employed in this step to the viscous or solid product prepared in step (I); i.e., [water/viscous or solid product prepared in step (I)], is preferably 0.5 to 45, more preferably 1 to 25, much more preferably 2 to 15, from the viewpoints of highly effective mixing and production of uniform water dispersion.

No particular limitation is imposed on the mixing method in step (II), and mixing may be carried out only by adding water to the viscous or solid product. However, from the viewpoint of attaining uniform particle size, mixing may be carried out through, for example, the mixing/dispersion method employed in production step (1) of the organic-pigment-containing anionic polymer particles, or a method employing a stirring apparatus, e.g., an ultrasonic disperser, three-one motor equipped with a stirring blade, and magnetic stirrer.

The water dispersion (A) produced in step (II) contains the chain-like particles. The water dispersion (A) containing the chain-like particles, or the water-based ink containing the water dispersion (A) realizes excellent optical density.

(Step (III))

Step (III) may optionally be carried out. In step (III), the water dispersion (A) produced in step (II) is mixed with a cross-linking agent, and the mixture is subjected to cross-linking treatment, to thereby produce a water dispersion (B). From the viewpoint of storage stability of the water dispersion or the ink, step (III) is preferably carried out.

The cross-linking agent employed is preferably a compound having a functional group which reacts with the anionic groups of the anionic polymer, more preferably a compound having, in the molecule, two or more (preferably two to six) functional groups which react with the anionic groups.

The amount of the cross-linking agent dissolved in 100 g of water at 25° C. is preferably 50 g or less, more preferably 40 g or less, much more preferably 30 g or less, from the viewpoint of effective cross-linking of the surface of the polymer (in particular, water-insoluble polymer). The cross-linking agent preferably has a molecular weight of 120 to 2,000, more preferably 150 to 1,500, much more preferably 150 to 1,000, from the viewpoints of high reactivity, as well as storage stability of the water dispersion.

(Cross-Linking Agent)

Examples of preferred cross-linking agents include the following compounds (a) to (c):

(a) compounds having in the molecule two or more epoxy groups; for example, polyglycidyl ethers such as ethylene glycol diglycidyl ether, polyethylene glycol diglycidyl ether, polypropylene glycol diglycidyl ether, glycerol triglycidyl ether, glycerol polyglycidyl ether, polyglycerol polyglycidyl ether, trimethylolpropane polyglycidyl ether, sorbitol polyglycidyl ether, pentaerythritol polyglycidyl ether, resorcinol diglycidyl ether, neopentyl glycol diglycidyl ether, and hydrogenated bisphenol A diglycidyl ether;

(b) compounds having in the molecule two or more oxazoline groups; for example, bisoxazoline compounds such as 2,2'-bis(2-oxazoline), 1,3-phenylene-bis-oxazoline, and 1,3-benzobisoxazoline, and compounds having terminal oxazoline groups obtained through reaction between such a bisoxazoline compound and a polybasic carboxylic acid; and (c) compounds having in the molecule two or more isocyanate groups; for example, organic polyisocyanates, and isocyanate-terminal prepolymers.

Of these cross-linking agents, (a) compounds having in the molecule two or more epoxy groups are preferred, with trimethylolpropane polyglycidyl ether being more preferred.

Regarding the amount of the cross-linking agent employed, the ratio by weight of the cross-linking agent to the anionic polymer [i.e., cross-linking agent/anionic polymer] is preferably 0.3/100 to 50/100, more preferably 1/100 to 40/100, much more preferably 2/100 to 30/100, particularly preferably 5/100 to 25/100, from the viewpoint of storage stability of the water dispersion or the ink.

The amount of the cross-linking agent employed (as reduced to amount of the reactive anionic groups of the anionic polymer) is preferably 0.1 to 20 mmol, more preferably 0.5 to 15 mmol, much more preferably 1 to 10 mmol, on the basis of 1 g of the anionic polymer.

The thus-obtained cross-linked polymer preferably contains an anionic group (particularly preferably, a carboxy group) neutralized with a base in an amount of 0.5 mmol or more on the basis of 1 g of the cross-linked polymer. Conceivably, the anionic group neutralized with the base in the cross-linked polymer dissociates in the water dispersion, and contributes to stability of the organic-pigment-containing cross-linked polymer particles by means of charge repulsion between anions.

The cross-linking ratio (mol %) of the cross-linked polymer, which is determined by use of the following formula, is preferably 10 to 80 mol %, more preferably 20 to 70 mol %, much more preferably 30 to 60 mol %. The cross-linking ratio can be calculated, by use of the following formula (III), from the amount of the cross-linking agent employed, the amount by mole of the reactive groups thereof, the amount of the polymer employed, and the amount by mole of the reactive groups of the polymer capable of reacting with the reactive groups of the cross-linking agent.

Cross-linking ratio (mol %)=[the amount by mole of the reactive groups of a cross-linking agent×100/the amount by mole of the reactive groups of a polymer capable of reacting with the cross-linking agent]   (III)

"The amount by mole of the reactive groups of a cross-linking agent" in formula (III) is obtained by dividing the weight of the cross-linking agent by the equivalent of the reactive groups thereof; i.e., by multiplying the amount by mole of the cross-linking agent by the number of reactive groups in one molecule of the cross-linking agent.

[Production Method 2 for Water Dispersion for Ink-Jet Printing]

The water dispersion for ink-jet printing of the present invention may be effectively produced through the below-described production method 2.

Specifically, the water dispersion may be produced through a production method including a step of mixing a water dispersion (A) containing anionic organic pigment particles with an aqueous solution (B) containing a cationic polymer in a flow channel having a cross-sectional area of 0.001 to 0.5 $mm^2$ and a length of 0.1 to 10 mm, wherein the water dispersion (A) and the aqueous solution (B) are mixed so that the linear velocity of each of the water dispersion (A) and the aqueous solution (B), as measured at a point in the channel where the water dispersion (A) meets the aqueous solution (B), is 1 m/second or more, and the amount of the cationic groups of the cationic polymer is 5 to 50 mol % with respect to that of the anionic groups of the anionic organic pigment particles. The production method may optionally further include a cross-linking step.

In the aforementioned method, the water dispersion (A) containing the anionic organic pigment particles (e.g., the water dispersion containing organic-pigment-containing water-insoluble anionic polymer particles obtained through the method including steps (1) and (2)) is mixed with the aqueous solution (B) containing the cationic polymer in the aforementioned flow channel under the aforementioned conditions, whereby the cationic polymer can be uniformly dispersed in the water dispersion without causing local aggregation of the polymer particles. Therefore, the water dispersion containing the anionic organic pigment particles in the form of chain-like particles can be produced without forming coarse particles. Conceivably, the thus-produced water dispersion realizes excellent optical density and exhibits excellent filterability.

(Mixing by Microchannel)

Production method 2 preferably employs a microchannel having a flow channel cross-sectional area of 0.001 to 0.5 $mm^2$ and a flow channel length of 0.1 to 10 mm, from the viewpoints of suppression of formation of aggregates by laminar flow formation and non-uniform mixing, as well as improvement in optical density and filterability.

The microchannel employed has a flow channel cross-sectional area of preferably 0.005 to 0.2 $mm^2$, more preferably 0.01 to 0.1 $mm^2$, and a flow channel length of preferably 0.2 to 8 mm, more preferably 0.5 to 5 mm. As used herein, the term "flow channel length" refers to the length of a portion of a flow channel having a cross-sectional area of 0.001 to 0.5 $mm^2$.

From the aforementioned viewpoint, the linear velocity of each of the water dispersion (A) containing the anionic organic pigment particles and the aqueous solution (B) containing the water-soluble cationic polymer, as measured at a point in the channel where the water dispersion (A) meets the aqueous solution (B), is 1 m/second or more. As used herein, the "linear velocity in the channel" refers to the average linear velocity of each of the water dispersion (A) and the aqueous solution (B), as measured at a point in the channel where the water dispersion (A) meets the aqueous solution (B), and is obtained by dividing the amount of liquid which passes at the meeting point for a certain period of time by the cross-sectional area of the channel.

The linear velocity in the channel is 1 m/second or more. From the viewpoints of both optical density and filterability, particularly from the viewpoint of improvement in optical density, the linear velocity is preferably 2 m/second or more, more preferably 4 m/second or more, much more preferably 10 m/second or more. From the viewpoints of improvement in operatability and optical density, the linear velocity is preferably 1,000 m/second or less, more preferably 100 m/second or less, much more preferably 30 m/second or less.

Upon mixing in the microchannel, the ratio of the amount of the cationic groups of the cationic polymer to that of the anionic groups of the anionic pigment particles is 5 to 50 mol %, preferably 8 to 30 mol %, more preferably 10 to 25 mol %, much more preferably 12 to 20 mol %, from the viewpoint of improvement in optical density.

The ratio by weight of the anionic organic pigment particles to the cationic polymer; i.e., [anionic organic pigment particles/cationic polymer], is preferably 40 to 5,000, more preferably 80 to 2,000, much more preferably 100 to 1,000, particularly preferably 200 to 400, from the viewpoint of improvement in optical density of a printed image provided by the water dispersion.

Before mixing in the microchannel, the anionic organic pigment particle content of the water dispersion (A) containing the anionic organic pigment particles is preferably 1 to 40% by weight, more preferably 10 to 35% by weight, much more preferably 20 to 35% by weight.

Before mixing in the microchannel, the cationic polymer content of the aqueous solution (B) containing the cationic polymer is preferably 0.01 to 5% by weight, more preferably 0.05 to 1% by weight, much more preferably 0.1 to 0.5% by weight.

It has not been elucidated why the water dispersion which realizes excellent optical density and exhibits excellent filterability is produced by adding the cationic polymer to the water dispersion (A) containing the anionic organic pigment particles by means of the aforementioned microchannel. However, the reason for this is considered to be as follows.

In the microchannel, each liquid forms a laminar flow having a very small contact area (i.e., very close state). Conceivably, when the thus-formed laminar flow is released and ejected from a channel having a small cross-sectional area, the water dispersion (A) containing the anionic organic pigment particles and the aqueous solution (B) containing the cationic polymer are homogenized by means of the dissipation effect, and the cationic polymer is uniformly deposited onto the anionic organic pigment particles, followed by formation of chain-like particles through repeated collision between polymer-deposited particles.

Conceivably, since the microchannel (unlike the case of another stirrer or disperser) causes neither contact between droplets having large contact area before mixing, nor partially biased shear force, chain-like polymer particles having uniform particle size can be produced, and the water dispersion which realizes excellent optical density and exhibits excellent filterability is produced.

Also, conceivably, when the organic-pigment-containing water-insoluble anionic polymer particles are employed, elution of the polymer is prevented in the aforementioned mixing step, and thus the cationic polymer effectively interacts with the particles and also contributes to sufficient homogenization in the microchannel. In addition, conceivably, the thus-formed chain-like particles form strong irregular-shaped particles through entanglement or fusion between the polymer particles, and permeation thereof into a paper sheet can be further suppressed, whereby excellent optical density or filterability is attained.

No particular limitation is imposed on the material, inner surface shape, mixing angle, etc. of the microchannel employed in the present invention, so long as at least the point where two liquids are mixed, and the shape of the flow channel after mixing satisfy the aforementioned conditions. The microchannel employed is preferably any of the below-described ones.

The microchannel is preferably formed of such a material that permits treatment of an aqueous solution or a water dispersion under high-pressure conditions; for example, metal or glass. The microchannel is preferably formed of stainless steel.

The inner surface of the microchannel preferably has such a shape that achieves low friction, from the viewpoint of reduction of pressure loss.

Figure 6:
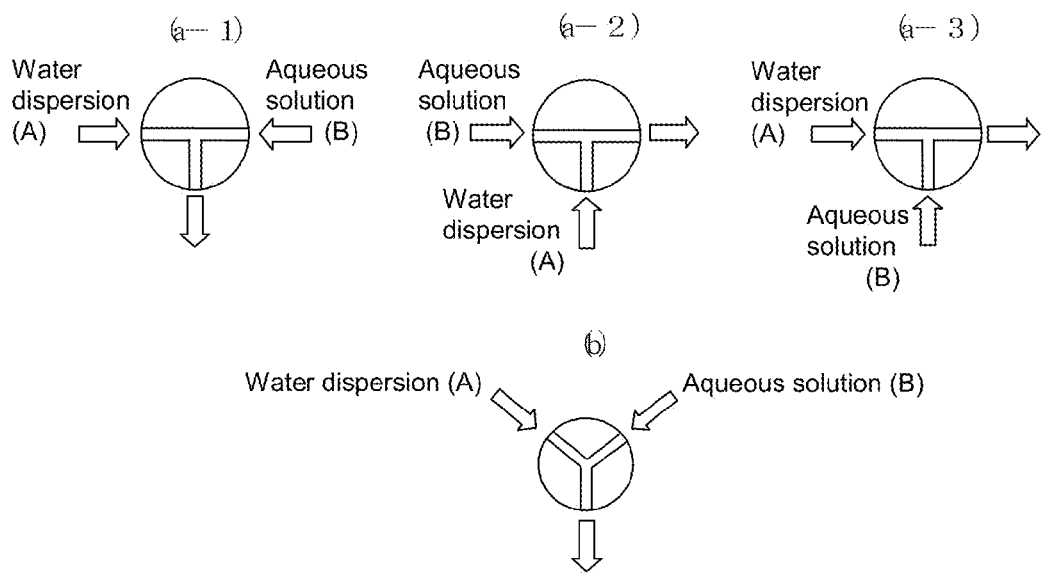
FIG. 6(a-1), 6(a-2) or 6(a-3) is a schematic representation of one example of a T-shaped microchannel.

The microchannel employed preferably has such a structure that a liquid to be mixed can be caused to flow at an angle of 0 to 90° with respect to the flow direction after mixing. Specific examples of such a structure include a T-shaped structure (see FIG. 6(a)), a Y-shaped structure (see FIG. 6(b)), and a double-tube structure. Such a T-shaped structure microchannel is employed in three modes as shown in FIGS. 6(a-1), 6(a-2), and 6(a-3). Of these structures, a Y-shaped structure is more preferred.

Examples of the employable microchannel include commercially available micromixers and microreactors, and narrow tube connection parts such as a connector and an adaptor. Specific examples include joint parts such as a chromatograph joint (Low Dead Volume Union Tee SS-1F0-3GC, T-shaped, flow channel cross-sectional area: 0.07 mm$^2$, flow channel length: 1.25 mm) (product of Swagelok Company), and Microvolume Connector MT1XCS6 (T-shaped, flow channel cross-sectional area: 0.018 mm$^2$, flow channel length: 1.25 mm) and MY1XCS6 (Y-shaped, flow channel cross-sectional area: 0.018 mm$^2$, flow channel length: 1.25 mm) (products of GL Sciences Inc.); Slit-Type Micro Mixers SSIMM (product of IMM GmbH); and Micromixer YM-2 (product of Yamatake Corporation).

Preferably, a pump with low pulsation is employed for feeding a liquid into the microchannel. A syringe pump is preferably employed. The syringe pump employed is preferably a pump capable of feeding a liquid at a high pressure of 1 MPa or more; for example, a syringe pump manufactured by Toray Engineering Co., Ltd. or Harvard Apparatus. Also, there may be employed, for example, a low-pulsation diaphragm pump or a plunger pump manufactured by Tacmina Corporation or Fuji Techno Industries Corporation.

[Production Method 3 for Water Dispersion for Ink-Jet Printing]

The water dispersion for ink-jet printing of the present invention may be effectively produced through the below-described production method 3.

Specifically, the water dispersion may be produced through a production method including a step of adding a cationic polymer to a water dispersion containing organic-pigment-containing water-insoluble anionic polymer particles by means of a rotary shear-type stirring apparatus having a rotor-stator structure at a shear speed of 1 m/second or more, which method may optionally further include a cross-linking step.

The shear speed is obtained by multiplying the maximum circumferential length of a rotor by the rotational speed of the rotor. For example, when a rotor having a diameter of 8 mm is rotated at 20,000 rotations/minute, the shear speed is calculated as follows.

$$(0.008 \text{ (m)} \times 3.14) \times 333 \text{ (rotations/second)} = 8.37 \text{ (m/second)}$$

(Cationic Polymer Addition Step)

In the cationic polymer addition step of production method 3, for example, a cationic polymer (in the form of solution or dispersion) is added to the water dispersion containing organic-pigment-containing water-insoluble anionic polymer particles obtained through the method including steps (1) and (2) by means of a rotary shear-type stirring apparatus having a rotor-stator structure at a shear speed of 1 m/second or more, preferably 2 m/second or more, more preferably 4 m/second or more, much more preferably 8 to 40 m/second. When the cationic polymer is added under the aforementioned shear conditions, the cationic polymer can be uniformly dispersed in the water dispersion without causing local aggregation of the polymer particles. Therefore, the water dispersion containing the organic-pigment-containing water-insoluble anionic polymer particles in the form of chain-like particles can be produced without forming coarse particles. The thus-produced water dispersion of the organic-pigment-containing polymer particles realizes excellent optical density and exhibits excellent filterability.

Addition of the cationic polymer may be carried out at a position where the aforementioned shear conditions are achieved after mixing. However, from the viewpoint of filterability, preferably, addition is carried out at a position where the water dispersion is fluidized under the aforementioned shear conditions. Specifically, addition is carried out within a zone defined by a hypothetical hollow cylinder, placed such that the center of the cylinder coincides with the center of the rotary shaft of the rotor and having a circular bottom having a radius twice that of the rotor of the stirring apparatus.

A single or a plurality of rotary shear-type stirring apparatuses having a rotor-stator structure may be employed for achieving the aforementioned shear conditions.

The ratio by weight of the organic-pigment-containing water-insoluble anionic polymer particles to the cationic polymer employed in this step; i.e., [organic-pigment-containing water-insoluble anionic polymer particles/cationic polymer], is preferably 40 to 5,000, more preferably 80 to 2,000, still more preferably 100 to 1,000, much more preferably 200 to 600, much more preferably 200 to 400, from the viewpoint of improvement in optical density of a printed image provided by the water dispersion.

(Rotary Shear-Type Stirring Apparatus Having Rotor-Stator Structure)

The rotary shear-type stirring apparatus having a rotor-stator structure is a stirring apparatus including a rotor and a stator, wherein shear force is applied to a fluid at a gap between the rotor and the stator, and at a slit portion of the rotor. More specifically, the stirring apparatus includes a cylindrical stator (fixed ring) which is fixed in a stirring chamber and which also serves as a baffle, and a rotor (turbine blade) which is accommodated in a hollow portion of the stator and which rotates at a specific speed by means of a motor, wherein each of the stator and the rotor has a plurality of radially provided flow channels.

It has not been elucidated why the water dispersion which realizes excellent optical density and exhibits excellent filterability is produced through addition of the cationic polymer by means of the rotary shear-type stirring apparatus. However, the reason for this is considered to be as follows.

In the case of addition of the cationic polymer by means of the rotary shear-type stirring apparatus, the stirring apparatus is placed in the water dispersion containing the organic-pigment-containing anionic polymer particles, and the solution or dispersion of the cationic polymer is supplied in the vicinity of a hollow portion of the rotor while the rotor is rotated. Then, centrifugal force is applied to the solution or dispersion of the cationic polymer, and the solution or the dispersion is ejected through radially provided flow channels of the rotor. The thus-ejected solution or dispersion enters a gap between the rotor and the stator, and also enters radially provided flow channels of the stator. Since the stator is fixed without being rotated, when the rotor is rotated, vortex flow occurs in the liquid present in the radially provided flow channels of the rotor and the stator, and shear force corresponding to the rotational speed of the rotor is applied to the liquid present in the gap between the rotor and the stator. Therefore, the water dispersion containing the organic-pigment-containing anionic polymer particles and the solution or dispersion containing the cationic polymer are homogenized by means of such vortex flow or shear energy.

Conceivably, since the rotary shear-type stirring apparatus having a rotor-stator structure allows uniform dispersion and homogenization of the cationic polymer throughout a liquid immediately after addition thereof to the liquid (unlike the case of another stirrer or disperser), and the apparatus does not cause partially biased shear force (unlike the case of a media disperser), chain-like polymer particles having uniform particle size can be produced, and the water dispersion which realizes excellent optical density and exhibits excellent filterability is produced.

Also, conceivably, since the organic-pigment-containing water-insoluble anionic polymer particles are employed in the present invention, elution of the polymer is prevented in the addition step, and thus aggregation is less likely to occur, and sufficient homogenization is achieved by means of the rotary shear-type stirring apparatus. In addition, conceivably, the thus-formed chain-like particles form strong irregular-shaped particles through entanglement or fusion between the polymer particles, whereby excellent optical density or filterability is attained.

In the case of addition of the solution or dispersion of the cationic polymer, preferably, the solution or the dispersion is added to and brought into contact with the water dispersion containing the organic-pigment-containing anionic polymer particles within a zone defined by a hypothetical hollow cylinder, placed such that the center of the cylinder coincides with the center of the rotary shaft of the rotor and having a circular bottom having a radius twice that of the rotor of the stirring apparatus. The aforementioned space is preferably a zone defined by a hypothetical hollow cylinder having a circular bottom having a radius 1.8 times that of the rotor, exclusive of a zone defined by a hypothetical hollow cylinder having a circular bottom having a radius 0.5 times that of the rotor. The aforementioned space is more preferably a zone defined by a hypothetical hollow cylinder having a circular bottom having a radius 1.7 times that of the rotor, exclusive of a zone defined by a hypothetical hollow cylinder having a circular bottom having a radius equal to that of the rotor. The aforementioned space is much more preferably a zone defined by a hypothetical hollow cylinder having a circular bottom having a radius 1.6 times that of the rotor, exclusive of a zone defined by a hypothetical hollow cylinder having a circular bottom having a radius 1.4 times that of the rotor. When the solution or dispersion of the cationic polymer is added to the aforementioned space, the cationic polymer is uniformly dispersed in the water dispersion containing the organic-pigment-containing anionic polymer particles at the same time of coming into contact with the water dispersion, to thereby produce the water dispersion for ink-jet printing containing small amounts of coarse particles and exhibiting excellent filterability.

For more effective homogenization and dispersion in the rotary shear-type stirring apparatus, preferably, large shear force is applied to the liquid supplied between the rotor and the stator. Therefore, preferably, the gap provided between the inner surface of the stator and the outer surface of the rotor is reduced, and the peripheral speed (rotational speed) of the turbine blade of the rotor is increased. From this viewpoint, the gap between the inner surface of the stator and the outer surface of the rotor is preferably 5 mm or less, more preferably 0.01 to 2 mm, much more preferably 0.1 to 0.2 mm. The peripheral speed of the turbine blade of the rotor is preferably 2 m/second or more, more preferably 4 m/second or more, much more preferably 8 to 40 m/second.

Examples of commercially available rotary shear-type stirring apparatuses include Biomixer BM and MBM series (trade name, Nihonseiki Kaisha Ltd.); homomixers such as T.K. Homo Mixer, T.K. Pipeline Mixer, T.K. Homo Jetter, and T.K. Homomic Line Flow (trade name, Primix Corporation); Milder (trade name, Ebara Corporation and Pacific Machinery & Engineering Co., Ltd.); and Ultra Turrax (trade name, IKA Japan K.K.). Of these, Biomixer (trade name, product of Nihonseiki Kaisha Ltd.), T.K. Homo Mixer (trade name, product of Primix Corporation), or Ultra Turrax (trade name, product of IKA Japan K.K.) is more preferred, with Biomixer (product of Nihonseiki Kaisha Ltd.) being much more preferred.

When a biomixer is employed, the rotational speed of the rotor is preferably adjusted to 10,000 rotations/minute or more, more preferably 15,000 rotations/minute or more, much more preferably 20,000 rotations/minute or more.

[Production Method 4 for Water Dispersion for Ink-Jet Printing]

The water dispersion for ink-jet printing of the present invention may be effectively produced through production method 4 including the following steps (a) and (b), and optionally step (c):

step (a): a step of adjusting the pH of a water dispersion containing organic-pigment-containing water-insoluble anionic polymer particles to 8 to 12, and then adding a cationic polymer thereto;

step (b): a step of lowering and adjusting the pH of the water dispersion obtained in step (a) to 7 to 9.; and step (c): a step of adding a cross-linking agent to the water dispersion of the organic-pigment-containing water-insoluble anionic polymer particles produced in step (b), to thereby produce organic-pigment-containing anionic cross-linked polymer particles.

Step (a)

In step (a), the pH of a water dispersion containing organic-pigment-containing water-insoluble anionic polymer particles produced through the aforementioned production method is adjusted to 8 to 12, and then a cationic polymer is added to the water dispersion.

Adjustment of the pH of the water dispersion containing the organic-pigment-containing water-insoluble anionic polymer particles to 8 to 12 may be carried out through, for example, addition of a base. Examples of the base include lithium hydroxide, sodium hydroxide, potassium hydroxide, cesium hydroxide, ammonium hydroxide, and amines.

In step (a), in order to prevent reaction between the cationic polymer added after pH adjustment and the anionic polymer forming the organic-pigment-containing water-insoluble anionic polymer particles, and to uniformly disperse the particles in the water dispersion, the pH of the water dispersion containing the organic-pigment-containing water-insoluble anionic polymer particles is adjusted to 8 to 12, preferably 9 to 12, more preferably 10 to 12, much more preferably 10.5 to 11.5, so that the anionic group of the polymer forming the organic-pigment-containing water-insoluble anionic polymer particles is transformed into a salt thereof.

In the case where, for example, the polymer forming the organic-pigment-containing water-insoluble anionic polymer particles has a carboxy group, and the cationic polymer is polyethyleneimine, when the pH of the water dispersion containing the polymer particles is adjusted to 8 to 12 (preferably 9 to 12) by use of sodium hydroxide serving as a base, to thereby transform the carboxy group of the anionic polymer into a sodium salt (—COONa), followed by addition of polyethyleneimine, since polyethyleneimine does not react with the carboxy group at such a pH that the carboxy group is transformed into a sodium salt, local aggregation of the particles does not occur, and polyethyleneimine is uniformly dissolved or dispersed in the water dispersion.

Step (b)

In step (b), the pH of the water dispersion obtained in step (a), in which the cationic polymer is uniformly dissolved or dispersed, is lowered and adjusted to 7 to 9.

In this step, the sodium salt (—COONa) of the carboxy group, which has been formed in the above-exemplified step (a), is again transformed into a carboxy group, and the carboxy group interacts with polyethyleneimine (i.e., cationic polymer).

Therefore, conceivably, polyethyleneimine interacts with the anionic groups of the organic-pigment-containing water-insoluble anionic polymer particles, to thereby promote aggregation of a plurality of water-insoluble anionic polymer particles, and thus permeation of the pigment into a paper sheet after printing is suppressed, resulting in improvement in optical density. Also, conceivably, when the pH of the water dispersion is lowered and adjusted so as to fall within the aforementioned pH range in this step, adsorption of the cationic polymer onto the surfaces of the anionic polymer particles is promoted, and the amount of the cationic polymer dissolved or dispersed, as is, in the water dispersion or the ink is reduced. Therefore, conceivably, the resultant water dispersion or ink exhibits high dispersion stability, and excellent filterability and storage stability.

Lowering and adjustment of the pH of the water dispersion to 7 to 9 may be carried out by, for example, adding an acid or an acidic aqueous solution to the water dispersion, or by bringing the water dispersion into contact with a solid acid or a cation exchange resin.

Examples of the acid component of the acid or acidic aqueous solution employed include inorganic acids such as hydrochloric acid, acetic acid, pronionic acid, phosphoric acid, and sulfuric acid; and organic acids such as citric acid, lactic acid, tartaric acid, succinic acid, malic acid, ascorbic acid, glycolic acid, gluconic acid, and glyceric acid.

Examples of the solid acid include activated clay, acid clay, silica, and alumina.

Examples of the cation exchange resin include synthetic resins having, for example, a sulfonate group, a carboxy group, or a phosphate group. Examples of commercially available cation exchange resins include Diaion SK series (e.g., SK1B, SK1BH, and SK102), Diaion PK series (e.g., PK208 and PK212), and Diaion CR10 (chelating resin) (products of Mitsubishi Chemical Corporation); Amberlite 200CT and Amberlite No. 100 series (e.g., IR120B, IR124, and IR118) (products of Rohm and Haas, USA); and Dowex W series (e.g., 50W•X1) (products of Dow Chemical Company).

Particularly preferably, a cation exchange resin having a sulfonate group is employed, since a sulfonate group exhibits strong cation exchange ability. Cation exchange resins having a sulfonate group are divided into a hydrogen ion type and a metal ion (e.g., sodium ion or potassium ion) type. From the viewpoint of effective pH adjustment, a hydrogen ion-type cation exchange resin is preferably employed. Examples of such a strong cation exchange resin include Amberlite IR120B (product of Rohm and Haas, USA), and Diaion SK-1B and hydrogen-ion-exchanged SK-1BH (products of Mitsubishi Chemical Corporation).

When the water dispersion is brought into contact with a cation exchange resin, a batch process, a semi-batch process, a semi-continuous process, or a continuous process may be carried out. For example, there may be carried out a process in which cation exchange resin particles are added to the water dispersion, and the resultant mixture is stirred; or a process in which the water dispersion is continuously caused to pass through a column charged with a cation exchange resin.

From the viewpoints of easy pH adjustment, process simplification, suppression of generation of by-product such as a salt, and improvement in storage stability, preferably, the water dispersion is brought into contact with a cation exchange resin.

Step (c)

In step (c), a cross-linking agent is added to the water dispersion of the organic-pigment-containing water-insoluble anionic polymer particles obtained in step (b), to thereby produce a water dispersion of organic-pigment-containing anionic cross-linked polymer particles. When the anionic polymer is subjected to cross-linking treatment, the storage stability of the organic-pigment-containing water-insoluble anionic polymer particles in the water dispersion can be improved. Cross-linking treatment of the anionic polymer may be performed before or after the aforementioned step (2), or in the state where the organic solvent remains. However, when cross-linking treatment is carried out in step (c), the storage stability of the organic-pigment-containing water-insoluble anionic polymer particles in the water dispersion can be further improved. The aforementioned cross-linking treatment may be performed in combination with cross-linking treatment in step (c).

The cross-linking agent employed is preferably a compound having a functional group which reacts with the anionic groups of the anionic polymer, more preferably a compound having, in the molecule, two or more (preferably two to six) functional groups which react with the anionic groups.

In the present invention, the amount of the cross-linking agent dissolved in 100 g of water at 25° C. is preferably 50 g or less, more preferably 40 g or less, much more preferably 30 g or less, from the viewpoint of effective cross-linking of the surfaces of the water-insoluble anionic polymer particles. The cross-linking agent preferably has a molecular weight of 120 to 2,000, more preferably 150 to 1,500, much more preferably 150 to 1,000, from the viewpoints of reactivity, and storage stability of the water dispersion.

[Water Dispersion for Ink-Jet Printing]

The water dispersion of the present invention produced through any of the aforementioned production methods contains anionic organic pigment particles (in particular, solid chain-like particles containing a cationic polymer and organic-pigment-containing water-insoluble anionic (cross-linked) polymer particles) dispersed in water (i.e., main medium). The chain-like particles are as described above.

The water dispersion of the present invention may contain a humectant or an organic solvent for preventing it from being dried. The water dispersion may be employed, as is, as a water-based ink.

The amounts of the respective components of the water dispersion of the present invention are as follows.

The amount of the organic pigment contained in the anionic organic pigment particles employed in the water dispersion of the present invention is preferably 2 to 35% by weight, more preferably 3 to 30% by weight, much more preferably 5 to 25% by weight, on the basis of the entirety of the water dispersion, from the viewpoint of improvement in optical density of a printed image provided by the water dispersion.

The ratio by weight of the anionic organic pigment particles (e.g., organic-pigment-containing water-insoluble anionic polymer particles) to the cationic polymer; i.e., [anionic organic pigment particles/cationic polymer], is preferably 40 to 5,000, more preferably 80 to 2,000, much more preferably 100 to 1,000, particularly preferably 200 to 600, from the viewpoint of improvement in optical density of a printed image provided by the water dispersion or the water-based ink containing the water dispersion.

The water content of the water dispersion is preferably 20 to 90% by weight, more preferably 30 to 80% by weight, much more preferably 40 to 70% by weight.

The water dispersion of the present invention preferably has a surface tension (20° C.) of 30 to 70 mN/m, more preferably 35 to 65 mN/m.

The water dispersion of the present invention preferably has a viscosity (20° C.) at 20% by weight (solid content) of 1 to 12 mPa·s, more preferably 1 to 9 mPa·s, still more preferably 2 to 6 mPa·s, much more preferably 2 to 5 mPa·s.

[Water-Based Ink for Ink-Jet Printing]

The water-based ink for ink-jet printing of the present invention, which contains the water dispersion of the present invention, may contain an additive which is generally used in a water-based ink, such as a humectant, a penetrant, a dispersant, a surfactant, a viscosity modifier, a defoaming agent, a preservative, a mildew-proof agent, or an anti-corrosion agent.

The amounts of the respective components of the water-based ink of the present invention are as follows.

The organic pigment content of the water-based ink of the present invention, which pigment is contained in the anionic organic pigment particles employed in the ink, is preferably 1 to 25% by weight, more preferably 2 to 20% by weight, still more preferably 4 to 15% by weight, much more preferably 5 to 12% by weight, from the viewpoint of improvement in optical density of a printed image provided by the water-based ink.

The water content of the water-based ink is preferably 20 to 90% by weight, more preferably 30 to 80% by weight, much more preferably 40 to 70% by weight.

The water-based ink of the present invention preferably has a surface tension (20° C.) of 23 to 50 mN/m, more preferably 23 to 45 mN/m, much more preferably 25 to 40 mN/m.

The water-based ink of the present invention preferably has a viscosity (20° C.) of 2 to 20 mPa·s, more preferably 2.5 to 16 mPa·s, much more preferably 2.5 to 12 mPa·s, from the viewpoint of maintenance of good ejection reliability.

No particular limitation is imposed on the ink-jet system to which the water-based ink of the present invention is applied. However, the water-based ink is particularly preferably employed in a piezo-type ink-jet printer.

EXAMPLES

In the following Preparation Examples, Examples, and Comparative Examples, unless otherwise specified, the units "part(s)" and "%" refer to "part(s) by weight" and "% by weight," respectively. The weight average molecular weight of each polymer, average particle size, the percent area (%) of secondary particle, and the ratio (% by number) of chain-like particles were determined in the following procedures. Each water-based ink was employed for printing according to the following printing process, and the optical density of the printed image was evaluated.

(1) Determination of Weight Average Molecular Weight of Anionic Polymer

Phosphoric acid and lithium bromide were dissolved in N,N-dimethylformamide so that the concentrations thereof were adjusted to 60 mmol/L and 50 mmol/L, respectively, to thereby prepare a solvent. Each polymer was dissolved in the thus-prepared solvent, and the solution was subjected to gel chromatography [TSK-GEL α-M×2 in HLC-8120GPC, product of Tosoh Corporation (flow rate: 1 mL/minute)]. Polystyrene was used as a standard.

(2) Determination of Average Particle Size of Organic-Pigment-Containing Anionic Polymer Particles, and Average Particle Size of Secondary Particles (e.g., Chain-Like Particles) Contained in Water Dispersion Average particle size was measured by means of a laser particle analyzing system "ELS-8000" (cumulant analysis) available from Otsuka Electronics Co., Ltd. The particles to be analyzed were dispersed in water so as to form a dispersion having a particle concentration of about $5 \times 10^{-3}$% by weight. The measurement was performed at 25° C., an angle between the incident light and a detector of 90°, and a cumulative frequency of 100 times. The refractive index of water (1.333) was input to the analyzing system as a refractive index of the dispersing medium.

(3) Determination of Percent Area (%) of Secondary Particle, and Ratio (% by Number) of Chain-Like Particles Ion-exchange water was added to each of the water dispersions obtained in the Examples so that the solid content of the dispersion (i.e., the amount of organic-pigment-containing anionic polymer particles) was adjusted to 0.01%. The resultant dispersion was developed on a collodion-supported film (available from Okenshoji Co., Ltd., grid pitch: 150 μm) and dried. Thereafter, the particles were subjected to transmission electron microscope (TEM) photography by means of a TEM (JEM-2100, product of JEOL Ltd., acceleration voltage: 80 KV).

The percent area of secondary particle was determined as follows. By means of two-dimensional image analysis software WinROOF (available from Mitani Corporation), a circumscribed circle was drawn around one independent secondary particle observed in the above-obtained TEM photograph, and the area of the circle (A0 (nm$^2$)) was determined. Subsequently, the total area (A1 (nm$^2$)) of ellipses approximating primary particles forming secondary particles (each primary particle having a quadrangular shape as observed in the TEM photograph) was determined. The percent area (%) of secondary particle was calculated from the above-determined A0 and A1 [i.e., (A1/A0)×100].

By means of the same software, the number (N0) of 100 to 150 pigment primary particles was counted, and the number (N1) of pigment primary particles forming chain-like particles was counted, to thereby determine the ratio (% by number) of chain-like particles [i.e., (N1/N0)×100].

(4) Filterability

Each water dispersion was filtered by means of a 25-mL needle-less syringe [product of Terumo Corporation] equipped with a 5-μm filter [cellulose acetate membrane having an outer diameter of 2.5 cm, product of Sartorius Stedim Biotech]. The amount of the water dispersion until occurrence of clogging in one filter (hereinafter the amount may be referred to as the "amount of filter-passing dispersion") was measured, and the filterability was evaluated by the thus-measured amount. The larger the measured amount, the better the filterability.

(5) Storage Stability

Each water-based ink was charged into a glass container, and the container was hermetically sealed, followed by storage at 70° C. for 14 days. Before and after storage, the viscosity of the water-based ink was measured at 20° C. and 50 r/min by means of an E-type viscometer (RE80L, product of Toki Sangyo Co., Ltd., Rotor 1), and the percent change in viscosity was determined according to the following formula.

The percent change in viscosity was calculated from the above-measured viscosities, and storage stability was evaluated on the basis of the below-described criteria. The smaller the absolute value of the percent change in viscosity, the better the storage stability.

Percent change in viscosity (%)=(([viscosity after storage]−[viscosity before storage])/[viscosity before storage])×100

(6) Printing Method

Each water-based ink was charged, via a silicone tube, into a black head of an ink-jet printer (Model: EM-930C, product of Seiko Epson Corp., piezoelectric type) through an ink inlet provided above the black head. Subsequently, a solid image printing pattern (size: 204 mm in width×275 mm in length) was provided by use of Photoshop (trade name, product of Adobe Systems Incorporated.). Through varying the duty ratio of trial solid images (printing conditions: plain paper (printing paper), and black, fine, and bidirectional (printing mode)), the duty ratio was controlled so that the actual ejection amount was adjusted to 0.75±0.01 mg/cm$^2$. The ink discharge amount was determined from the change in weight of a screw pipe holding the ink. By use of the duty-controlled solid image, printing was performed on a commercial plain paper (XEROX 4200 (trade name), product of XEROX Corporation, high-quality paper grade).

(7) Measurement of Optical Density

The thus-obtained printed products were allowed to stand at 25° C. and a humidity of 50% for 24 hours. Then, the optical density of each print surface was measured by means of a Macbeth densitometer (Model: RD914, product of GretagMacbeth Corporation). In the measurement procedure, a light source D65 was employed for image observation, and the concentration of magenta color component was measured (field number: 2, concentration standard: DIN 16536). The points of measurement numbered 10, of which five were randomly selected from a printed portion in a forward printing direction, and the other five points were randomly selected from a printed portion in a reverse printing direction. The thus-obtained ten measurements were averaged.

(8) Measurement of Chroma

The above-obtained printed products were allowed to stand at 25° C. and a humidity of 50% for 24 hours. Then, the a* value and b* value of each print surface were measured by means of the aforementioned Macbeth densitometer (measurement mode: L*a*b*, light source for image observation: D65, field number: 2, CIELAB basis), to thereby determine chroma (metric chroma). The points of measurement numbered 10, of which five were randomly selected from a printed portion in a forward printing direction, and the other five points were randomly selected from a printed portion in a reverse printing direction. The thus-obtained ten measurements were averaged.

Chroma (L*a*b* color system) is represented by the following formula (i.e., distance from the center (point at which a*=b*=0: achromatic color). The larger the chroma, the brighter and better the color.

Chroma=[(a*)$^2$+(b*)$^2$]$^{1/2}$

Preparation Example 1

Preparation of Water Dispersion of Organic-Pigment-Containing Anionic Polymer Particles (1) Synthesis of Anionic Polymer Benzyl methacrylate (58 parts), methacrylic acid (42 parts), styrene (20 parts), styrene macromer (AS-6S (trade name), product of Toagosei Co., Ltd.) (solid content: 50%) (40 parts), polyethylene glycol methacrylate (Blemmer PP-800 (trade name), product of NOF Corporation) (30 parts), and phenoxy poly(ethylene glycol-propylene glycol) methacrylate (Blemmer 43PAPE-600B (trade name), product of NOF Corporation) (30 parts) were mixed together, to thereby prepare a monomer mixture.

Methyl ethyl ketone (18 parts), a polymerization chain-transfer agent (2-mercaptoethanol) (0.03 parts), and a 10% portion of the aforementioned monomer mixture were added to a reactor under mixing, and the reactor was sufficiently purged with nitrogen gas.

Separately, the remaining portion (90%) of the aforementioned monomer mixture, the aforementioned polymerization chain-transfer agent (0.27 parts), methyl ethyl ketone (42 parts), and a polymerization initiator (2,2'-azobis-(2,4-dimethylvaleronitrile), V-65 (trade name), product of Wako Pure Chemical Industries, Ltd.) (1.2 parts) were mixed together, and the resultant mixture was placed in a dropping funnel. The mixture in the reactor was heated to 75° C. under stirring in a nitrogen atmosphere, and the mixture in the dropping funnel was added dropwise to the reactor for three hours.

After completion of dropwise addition and elapse of two hours at 75° C., a solution prepared by dissolving the aforementioned polymerization initiator (0.3 parts) in methyl ethyl ketone (5 parts) was added thereto, and the mixture was further aged at 75° C. for two hours and at 80° C. for two hours, to thereby produce a polymer solution (weight average molecular weight of the polymer: 100,000).

(2) Preparation of Water Dispersion of Organic-Pigment-Containing Anionic Polymer Particles The polymer solution produced above in (1) was dried under reduced pressure, to thereby produce a polymer. This polymer (45 parts) was dissolved in methyl ethyl ketone (300 parts), and a neutralizing agent (5N aqueous sodium hydroxide) (10.2 parts), 25% aqueous ammonia (12.2 parts), ion-exchange water (1,150 parts), and a magenta pigment (solid solution pigment formed of non-substituted quinacridone and 2,9-dichloroquinacridone, Chromophthal Jet Magenta 2BC (trade name), product of BASF Japan Ltd.) (135 parts) were added to the solution. The resultant mixture was mixed by means of disperse blades (7,000 rpm) at 20° C. for one hour and further mixed for dispersing at 20° C. for 40 minutes by means of a bead-mill-type disperser (Ultra Apex Mill, Model: UAM-05, product of Kotobuki Industries, Co., Ltd., medium particles: zirconia beads, particle size: 0.05 mm). The thus-produced dispersion was subjected to further dispersion treatment (total: 5 passes) by means of Micro Fluidizer (high-pressure homogenizer, model: M-140K (trade name), product of Microfluidics) at 180 MPa.

From the resultant dispersion, methyl ethyl ketone and a part of water were removed at 60° C. under reduced pressure. The concentrate was subjected to centrifugation, and then filtered with a filter (Minisart Syringe Filter, product of Sartorius Stedim Biotech, pore size: 5 material: cellulose acetate) for removal of coarse particles, to thereby produce a water dispersion of organic-pigment-containing anionic polymer particles [solid content: 30.0%, average particle size: 75 nm]. FIG. 1 shows a TEM photograph of the thus-produced particles.

Example I-1

Preparation of Water Dispersion (1) for Ink-Jet Printing Containing Chain-Like Particles The water dispersion of organic-pigment-containing anionic polymer particles produced in Preparation Example 1 (50 g) was placed in a beaker, and a 10% aqueous solution of polyethyleneimine (type: SP-006, product of Nippon Shokubai Co., Ltd., number average molecular weight (Mn): 600) (0.73 g) prepared through dilution with ion-exchange water was added dropwise to the water dispersion under stirring. Subsequently, the water dispersion produced above in Preparation Example 1 (50 g) was added to the resultant dispersion, and then water was evaporated under stirring in a hot bath at 80° C., to thereby produce a viscous product having a solid content of about 60%. Thereafter, this viscous product was cooled to thereby produce a solid product [step (I)].

Ion-exchange water (50 parts) was added to the solid product produced in step (I), and the product was dispersed in water by means of a magnetic stirrer (model: MD-41, product of Yamato Scientific Co., Ltd.). Thereafter, the resultant dispersion was filtered with the aforementioned filter (product of Sartorius Stedim Biotech, pore size: 5 μm) for removal of coarse particles, to thereby produce a water dispersion having a solid content of 30% [step (II)].

An epoxy cross-linking agent (Denacol EX-321 (trade name), product of Nagase Chemtex Corporation, epoxy equivalent: 140) (0.53 g) was added to the water dispersion produced in step (II) (40 g), and the resultant mixture was maintained in a hot bath at 90° C. for one hour under stirring, to thereby perform cross-linking treatment [step (III)].

After cooling, the resultant product was filtered with the aforementioned filter (product of Sartorius Stedim Biotech, pore size: 5 μm) for removal of coarse particles, to thereby produce a water dispersion (1) for ink-jet printing containing chain-like particles having an average particle size of 181 nm (solid content: 30%, percent cross-linking of cross-linked polymer as determined by the aforementioned formula (1): 51.4 mol %).

Figure 2:
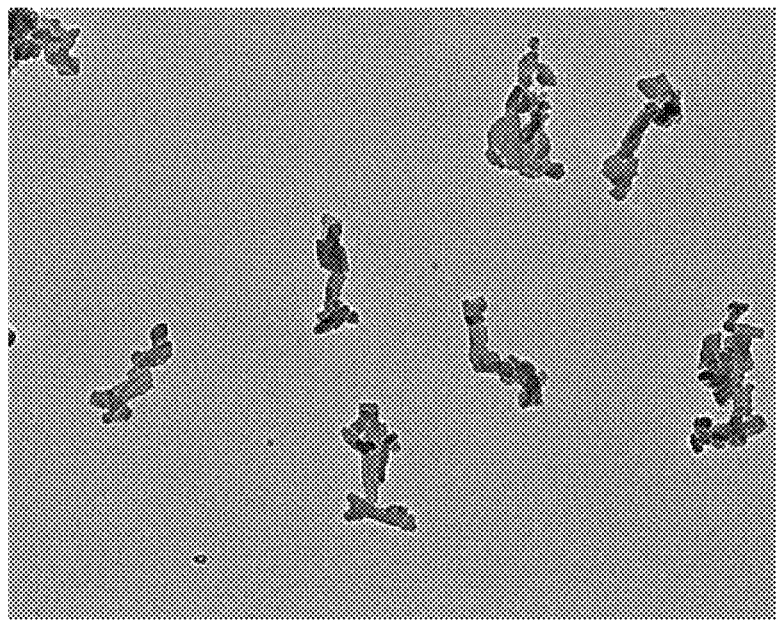
FIG. 2 is a TEM photograph of chain-like particles obtained in Example I-1.

FIG. 2 shows a TEM photograph of chain-like particles contained in the thus-produced water dispersion (1).

Figure 3:
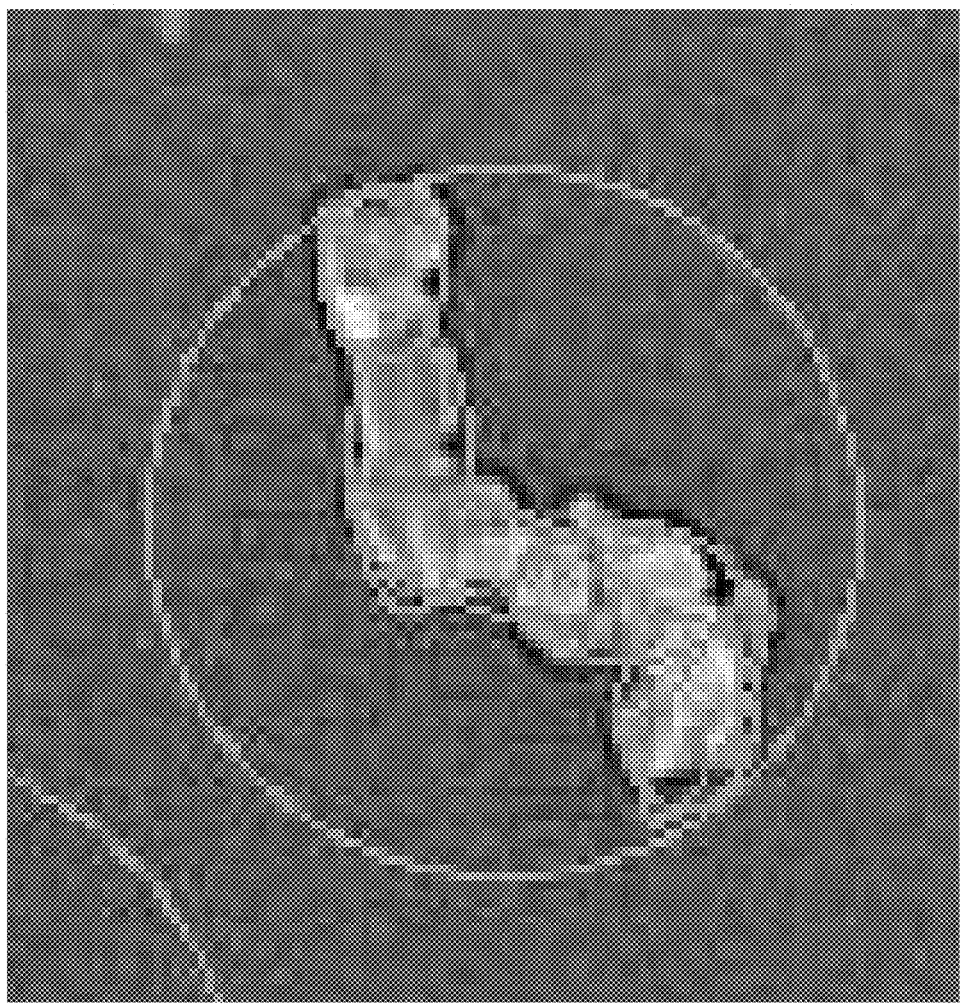
FIG. 3 is an enlarged TEM photograph of one chain-like particle obtained in Example I-1.

FIG. 3 is an enlarged TEM photograph of one chain-like particle obtained above.

In the particle shown in FIG. 3 (i.e., chain-like particle), the percent area of secondary particle was found to be 37.9% (i.e., $(A1/A0) \times 100 = (17,085 \text{ nm}^2/46,860 \text{ nm}^2) \times 100 = 37.9\%$).

In Example I-1, the ratio (% by number) of chain-like particles was found to be 60%.

Comparative Example I-1

Preparation of Water Dispersion (2) for Ink-Jet Printing

The water dispersion of organic-pigment-containing anionic polymer particles produced in Preparation Example 1 (50 g) was placed in a beaker, and a 10% aqueous solution of polyethyleneimine (type: SP-006, product of Nippon Shokubai Co., Ltd., number average molecular weight (Mn): 600) (0.73 g) prepared through dilution with ion-exchange water was added dropwise to the water dispersion under stirring. Subsequently, the water dispersion produced above in Preparation Example 1 (50 g) was added to the resultant dispersion, and the mixture was filtered with the aforementioned filter (product of Sartorius Stedim Biotech, pore size: 5 μm) for removal of coarse particles without evaporation of water, to thereby produce a water dispersion.

The thus-produced water dispersion was subjected to cross-linking treatment in the same manner as in the case of step (III) in Example I-1, to thereby prepare a water dispersion (2) for ink-jet printing.

The organic pigment particles contained in the water dispersion (2) were found to have an average particle size of 100 nm.

Figure 4:
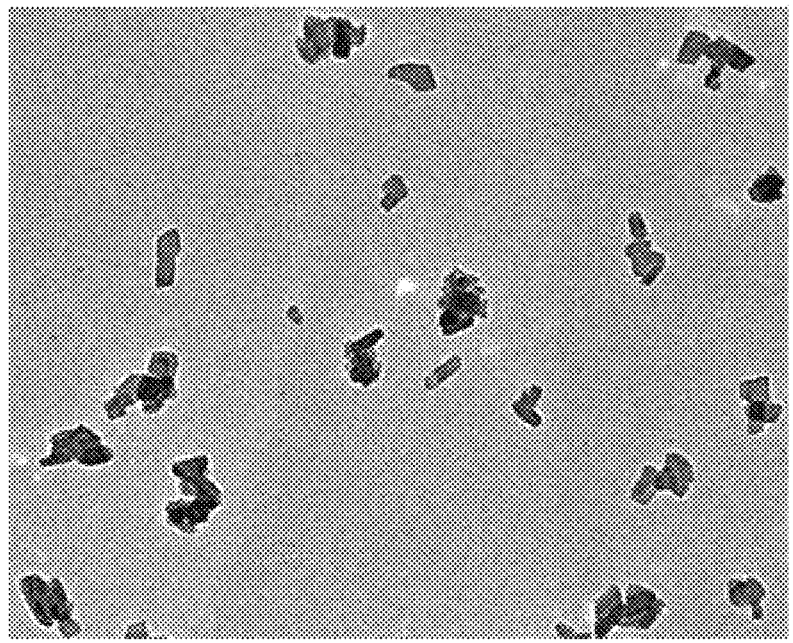
FIG. 4 is a TEM photograph of organic pigment particles obtained in Comparative Example I-1.

FIG. 4 shows a TEM photograph of organic pigment particles contained in the water dispersion (2).

Comparative Example I-2

Preparation of Water Dispersion (3) for Ink-Jet Printing

The procedure of Example I-1 was repeated, except that polyethyleneimine was not added, to thereby prepare a water dispersion (3) for ink-jet printing.

The organic pigment particles contained in the water dispersion (3) were found to have an average particle size of 100 nm.

Figure 5:
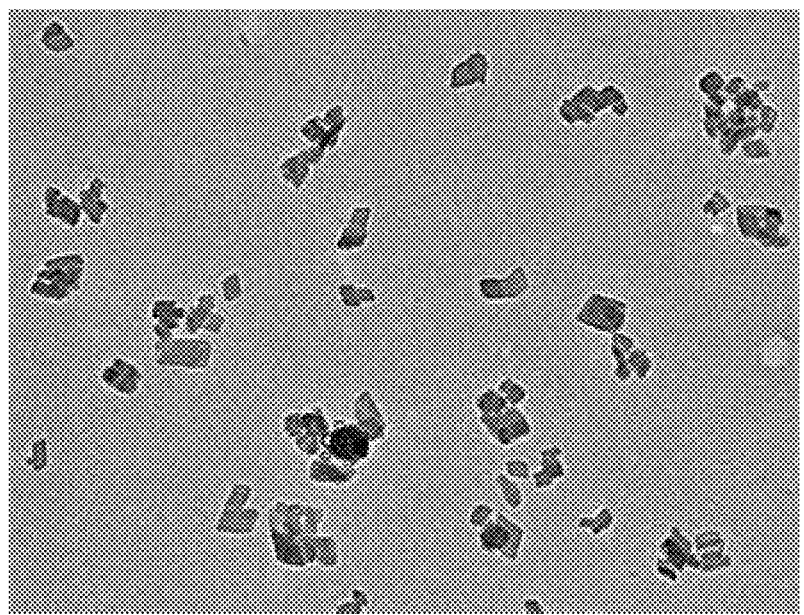
FIG. 5 is a TEM photograph of organic pigment particles obtained in Comparative Example 1-2.

FIG. 5 shows a TEM photograph of organic pigment particles contained in the water dispersion (3).

Example I-2

Production of Water-Based Ink

The water dispersion (1) for ink-jet printing produced in Example I-1 was provided in an amount of 13.3 parts (as reduced to solid content) or 10.0 parts (as reduced to pigment content).

1,2-Hexanediol (product of Tokyo Chemical Industry Co., Ltd.) (2.0 parts), 2-pyrrolidone (product of Wako Pure Chemical Industries, Ltd.) (2.0 parts), Surfynol 465 (product of Nisshin Chemical Industry Co., Ltd.) (0.5 parts), Olfine E1010 (product of Nisshin Chemical Industry Co., Ltd.) (0.5 parts), glycerin (product of Kao Corporation) (2.0 parts), triethylene glycol monobutyl ether (Butyl Triglycol (trade name), product of Nippon Nyukazai Co., Ltd.) (10.0 parts), Proxel XL2 (product of Arch Chemicals Japan, Inc.) (0.3 parts), and ion-exchange water were mixed together under stirring with a magnetic stirrer, followed by further stirring at room temperature for 15 minutes, to thereby prepare a solution mixture. The amount of ion-exchange water incorporated was adjusted so that the total amount of the solution mixture and the aforementioned water dispersion (1) for ink-jet printing was 100 parts.

Subsequently, while the above-provided water dispersion (1) for ink-jet printing was stirred with a magnetic stirrer, the above-prepared solution mixture was added thereto. The resultant mixture was filtered with a 1.2-μm filter (cellulose acetate membrane, product of Sartorius Stedim Biotech), to thereby produce a water-based ink. The results are shown in Table 1.

Comparative Example I-3

Production of Water-Based Ink

The procedure of Example I-2 was repeated, except that the water dispersion (1) for ink-jet printing containing chain-like particles produced in Example I-1 was replaced with the water dispersion (2) for ink-jet printing produced in Comparative Example I-1, to thereby produce a water-based ink. The results are shown in Table 1.

Comparative Example I-4

Production of Water-Based Ink

The procedure of Example I-2 was repeated, except that the water dispersion (1) for ink-jet printing containing chain-like particles produced in Example I-1 was replaced with the water dispersion (3) for ink-jet printing produced in Comparative Example I-2, to thereby produce a water-based ink. The results are shown in Table 1.

Comparative Example I-5

Production of Water-Based Ink

The procedure of Example I-2 was repeated, except that the water dispersion (1) for ink-jet printing containing chain-like particles produced in Example I-1 was replaced with the water dispersion of organic-pigment-containing anionic polymer particles prepared in Preparation Example 1, to thereby produce a water-based ink. The results are shown in Table 1.

TABLE 1

| Water-based ink | Production of water dispersion | Anionic organic pigment particles | Cationic polymer | With or without steps (I) to (III) | Average particle size (nm) | Ratio of average particle size of secondary particles to that of primary particles*2 | Ratio of chain-like secondary particles (% by number) | Optical density provided by ink |
|---|---|---|---|---|---|---|---|---|
| Ex. I-2 | Ex. I-1 | Anionic polymer particles*1 | Polyethyleneimine | With steps (I) to (III) | 181 | 2.4 | 60 | 1.10 |
| Comp. Ex. I-3 | Comp. Ex. I-1 | Anionic polymer particles*1 | Polyethyleneimine | Without steps (I) and (II)*3 | 100 | 1.3 | 7 | 1.04 |
| Comp. Ex. I-4 | Comp. Ex. I-2 | Anionic polymer particles*1 | — | With steps (I) to (III) | 100 | 1.3 | 6 | 1.04 |
| Comp. Ex. I-5 | Prep. Ex. I-1 | Anionic polymer particles*1 | — | Without steps (I) to (III) | 75 | — | 0 | 1.00 |

*1 Organic-pigment-containing anionic polymer particles

*2 Ratio of (average particle size of chain-like particles contained in water dispersion/average particle size of anionic organic pigment particles)

*3 In step (I), a mixture containing anionic organic pigment particles, a cationic polymer, and water was prepared, but removal of the water was not performed. However, step (III) was performed.

As is clear from Table 1, the water-based ink of Example I-2 containing the water dispersion of Example I-1 provides higher optical density, as compared with the water-based ink of Comparative Example I-3 or I-4 containing the water dispersion of Comparative Example I-1 or 1-2, or as compared with the water-based ink of Comparative Example I-5 containing only organic-pigment-containing anionic polymer particles.

Preparation Example 2

Preparation of Water Dispersion of Solid-Solution-Pigment-Containing Anionic Polymer Particles (1) Synthesis of Anionic Polymer Benzyl methacrylate (142 parts), methacrylic acid (38 parts), and styrene macromer having methacryloyl groups at one terminal ends (AS-6S (trade name), product of Toagosei Co., Ltd.) (solid content: 50%) (40 parts) were mixed together, to thereby prepare a monomer mixture.

Methyl ethyl ketone (18 parts), a polymerization chain-transfer agent (2-mercaptoethanol) (0.03 parts), and a 10% portion of the aforementioned monomer mixture were added to a reactor under mixing, and the reactor was sufficiently purged with nitrogen gas.

Separately, the remaining portion (90%) of the aforementioned monomer mixture, the aforementioned polymerization chain-transfer agent (0.27 parts), methyl ethyl ketone (42 parts), and a polymerization initiator (2,2'-azobis-(2,4-dimethylvaleronitrile), V-65 (trade name), product of Wako Pure Chemical Industries, Ltd.) (1.2 parts) were mixed together, and the resultant mixture was placed in a dropping funnel. The mixture in the reactor was heated to 75° C. under stirring in a nitrogen atmosphere, and the mixture in the dropping funnel was added dropwise to the reactor for three hours. After completion of dropwise addition and elapse of two hours at 75° C., a solution prepared by dissolving the aforementioned polymerization initiator (0.3 parts) in methyl ethyl ketone (5 parts) was added thereto, and the mixture was further aged at 75° C. for two hours and at 80° C. for two hours, to thereby produce an anionic polymer solution containing a benzyl methacrylate-derived structural unit in an amount of 71% by weight (weight average molecular weight of the polymer: 90,000).

(2) Preparation of Water Dispersion of Solid-Solution-Pigment-Containing Anionic Polymer Particles The anionic polymer solution produced above in (1) was dried under reduced pressure, to thereby produce an anionic polymer. This anionic polymer (45 parts) was dissolved in methyl ethyl ketone (300 parts), and a neutralizing agent (5N aqueous sodium hydroxide) (10.2 parts), 25% aqueous ammonia (12.2 parts), ion-exchange water (1,150 parts), and a magenta pigment (solid solution pigment formed of 2,9-dichloroquinacridone and non-substituted quinacridone, Chromophthal Jet Magenta 2BC (trade name), product of BASF Japan Ltd.) (180 parts) were added to the solution. The resultant mixture was mixed by means of disperse blades (7,000 rpm) at 20° C. for one hour and further mixed for dispersing at 20° C. for 40 minutes by means of a bead-mill-type disperser (Ultra Apex Mill, Model: UAM-05, product of Kotobuki Industries, Co., Ltd., medium particles: zirconia beads, particle size: 0.05 mm). The thus-produced dispersion was subjected to further dispersion treatment (total: 5 passes) by means of Micro Fluidizer (trade name, high-pressure homogenizer, model: M-140K, product of Microfluidics) at 180 MPa.

From the resultant dispersion, methyl ethyl ketone and a part of water were removed at 60° C. under reduced pressure. The concentrate was subjected to centrifugation, and then filtered with a filter (Minisart Syringe Filter, product of Sartorius Stedim Biotech, pore size: 5 µm, material: cellulose acetate) for removal of coarse particles, to thereby produce a water dispersion of solid-solution-pigment-containing anionic polymer particles (solid content: 30.0%, average particle size: 80 nm).

Example II-1

Preparation of Water Dispersion for Ink-Jet Printing

The water dispersion of solid-solution-pigment-containing anionic polymer particles produced in Preparation Example 2 (2) (50 g) was placed in a beaker, and the beaker was placed in a water bath at 0° C. While the particles were dispersed by means of a homogenizer at 7,000 rpm, a 0.3% aqueous solution (9.5 g) of polyethyleneimine (Epomin SP-200, product of Nippon Shokubai Co., Ltd., number average molecular weight (Mn): 10,000) was added dropwise to the water dispersion at a rate of 20 mL/minute. The resultant dispersion was filtered with the aforementioned filter (product of Sartorius Stedim Biotech, pore size: 5 µm) for removal of coarse particles, to thereby produce a water dispersion for ink-jet printing containing particles having an average particle size of 110 nm. An epoxy cross-linking agent (Denacol EX-321 (trade name), product of Nagase Chemtex Corporation, epoxy equivalent: 140) (0.47 g) and ion-exchange water (1.07 g) were added to the thus-produced water dispersion (40 g), and the resultant mixture was maintained in a hot bath at 90° C. for one hour under stirring. After cooling, the resultant product was filtered with the aforementioned filter (product of Sartorius Stedim Biotech, pore size: 5 µm) for removal of coarse particles, to thereby produce a water dispersion for ink-jet printing containing polyethyleneimine and solid-solution-pigment-containing anionic cross-linked polymer particles having an average particle size of 115 nm (cross-linking ratio of cross-linked polymer as determined by the aforementioned formula (1): 56.8 mol %).

Example II-2

Preparation of Water Dispersion for Ink-Jet Printing (1) Synthesis of Anionic Polymer The procedure of Preparation Example 2 (1) was repeated, except that benzyl methacrylate was replaced with benzyl acrylate, to thereby produce an anionic polymer solution (weight average molecular weight of the polymer: 90,000).

(2) Preparation of Water Dispersion of Solid-Solution-Pigment-Containing Anionic Polymer Particles The procedure of Preparation Example 2 (2) was repeated, except that the anionic polymer solution produced in Preparation Example 2 (1) was replaced with the anionic polymer solution produced in (1) above, to thereby produce a water dispersion of solid-solution-pigment-containing anionic polymer particles (solid content: 30.0%, average particle size: 80 nm).

(3) Preparation of Water Dispersion for Ink-Jet Printing

The procedure of Example II-1 was repeated, except that the water dispersion of solid-solution-pigment-containing anionic polymer particles produced in Preparation Example 2 (2) was replaced with the water dispersion of solid-solutionpigment-containing anionic polymer particles produced in (2) above, to thereby produce a water dispersion for ink-jet printing.

Comparative Example II-1

Preparation of Water Dispersion for Ink-Jet Printing (1) Synthesis of Anionic Polymer The procedure of Preparation Example 2 (1) was repeated, except that benzyl methacrylate was replaced with styrene, to thereby produce an anionic polymer solution (weight average molecular weight of the polymer: 90,000).

(2) Preparation of Water Dispersion of Solid-Solution-Pigment-Containing Anionic Polymer Particles The procedure of Preparation Example 2 (2) was repeated, except that the anionic polymer solution produced in Preparation Example 2 (1) was replaced with the anionic polymer solution produced in Comparative Example II-1 (1), to thereby produce a water dispersion of solid-solution-pigment-containing anionic polymer particles (solid content: 30.0%, average particle size: 85 nm).

(3) Preparation of Water Dispersion for Ink-Jet Printing

The procedure of Example II-1 was repeated, except that the water dispersion of pigment-containing anionic polymer particles produced in Preparation Example 2 (2) was replaced with the water dispersion of solid-solution-pigment-containing anionic polymer particles produced in Comparative Example II-1 (2), to thereby produce a water dispersion for ink-jet printing.

Comparative Example II-2

Preparation of Water Dispersion for Ink-Jet Printing (1) Synthesis of Anionic Polymer An anionic polymer solution (weight average molecular weight of the polymer: 90,000) was produced in the same manner as in Preparation Example 2 (1).

(2) Preparation of Water Dispersion of Solid-Solution-Pigment-Containing Anionic Polymer Particles The procedure of Preparation Example 2 (2) was repeated, except that the solid solution pigment was replaced with a solid solution pigment formed of 2,9-dimethylquinacridone and non-substituted quinacridone (Fastgen Super Magenta RY (trade name), product of DIC Corporation), to thereby produce a water dispersion of solid-solution-pigment-containing anionic polymer particles (solid content: 30.0%, average particle size: 85 nm).

(3) Preparation of Water Dispersion for Ink-Jet Printing

The procedure of Example II-1 was repeated, except that the water dispersion of solid-solution-pigment-containing anionic polymer particles produced in Comparative Example II-2 (2) was employed, to thereby produce a water dispersion for ink-jet printing.

Comparative Example II-3

Preparation of Water Dispersion for Ink-Jet Printing (1) Synthesis of Anionic Polymer An anionic polymer solution (weight average molecular weight of the polymer: 90,000) was produced in the same manner as in Preparation Example 2 (1).

(2) Preparation of Water Dispersion of Quinacridone-Pigment-Containing Anionic Polymer Particles The procedure of Preparation Example 2 (2) was repeated, except that the solid solution pigment was replaced with a pigment formed of 2,9-dimethylquinacridone (Fastgen Super Magenta RG (trade name), product of DIC Corporation), to thereby produce a water dispersion of quinacridone-pigment-containing anionic polymer particles [solid content: 30.0%, average particle size: 90 nm].

(3) Preparation of Water Dispersion for Ink-Jet Printing

The procedure of Example II-1 was repeated, except that the water dispersion of quinacridone-pigment-containing anionic polymer particles produced in Comparative Example II-3 (2) was employed, to thereby produce a water dispersion for ink-jet printing.

Comparative Example II-4

Preparation of Water Dispersion for Ink-Jet Printing (1) Synthesis of Anionic Polymer An anionic polymer solution (weight average molecular weight of the polymer: 90,000) was produced in the same manner as in Preparation Example 2 (1).

(2) Preparation of Water Dispersion of Quinacridone-Pigment-Containing Anionic Polymer Particles A water dispersion of solid-solution-pigment-containing anionic polymer particles (solid content: 30.0%, average particle size: 80 nm) was produced in the same manner as in Preparation Example 2 (2).

(3) Preparation of Water Dispersion for Ink-Jet Printing

The procedure of Example II-1 was repeated, except that polyethyleneimine was not added, to thereby produce a water dispersion for ink-jet printing.

Example II-3

Production of Ink 1,2-Hexanediol (product of Tokyo Chemical Industry Co., Ltd.) (2.0 parts), 2-pyrrolidone (product of Wako Pure Chemical Industries, Ltd.) (2.0 parts), Surfynol 465 (product of Nisshin Chemical Industry Co., Ltd.) (0.5 parts), Olfine E1010 (product of Nisshin Chemical Industry Co., Ltd.) (0.5 parts), glycerin (product of Kao Corporation) (2.0 parts), triethylene glycol monobutyl ether (Butyl Triglycol (trade name), product of Nippon Nyukazai Co., Ltd.) (10.0 parts), Proxel XL2 (product of Arch Chemicals Japan, Inc.) (0.3 parts), and ion-exchange water were mixed together under stirring with a magnetic stirrer, followed by further stirring at room temperature for 15 minutes, to thereby prepare a solution mixture. The amount of ion-exchange water incorporated was adjusted so that the total amount of the solution mixture and the water dispersion for ink-jet printing produced in Example II-1 was 100 parts.

Subsequently, while the water dispersion for ink-jet printing produced in Example II-1 (41.7 parts (12.5 parts as reduced to solid content, or 10.0 parts as reduced to pigment content)) was stirred with a magnetic stirrer, the above-prepared solution mixture was added thereto. The resultant mixture was filtered with a 1.2-μm filter (cellulose acetate membrane, product of Sartorius Stedim Biotech), to thereby produce a water-based ink. The evaluation results of the thus-produced water-based ink are shown in Table 2.

Example II-4

Production of Ink

The procedure of Example II-3 was repeated, except that the water dispersion prepared in Example II-2 was employed, to thereby produce a water-based ink. The evaluation results of the water-based ink are shown in Table 2.

Comparative Example II-5

Production of Ink

The procedure of Example II-3 was repeated, except that the water dispersion prepared in Comparative Example II-1 was employed, to thereby produce a water-based ink. The evaluation results of the water-based ink are shown in Table 2.

Comparative Example II-6

Production of Ink

The procedure of Example II-3 was repeated, except that the water dispersion prepared in Comparative Example II-2 was employed, to thereby produce a water-based ink. The evaluation results of the water-based ink are shown in Table 2.

Comparative Example II-7

Production of Ink

The procedure of Example II-3 was repeated, except that the water dispersion prepared in Comparative Example II-3 was employed, to thereby produce a water-based ink. The evaluation results of the water-based ink are shown in Table 2.

Comparative Example II-8

Production of Ink

The procedure of Example II-3 was repeated, except that the water dispersion prepared in Comparative Example II-4 was employed, to thereby produce a water-based ink. The evaluation results of the water-based ink are shown in Table 2.

size: 77 nm] was produced through the same basic procedure as that employed in Preparation Example 2.

Example III-1

Production of Water Dispersion for Ink-Jet Printing

Figure 7:
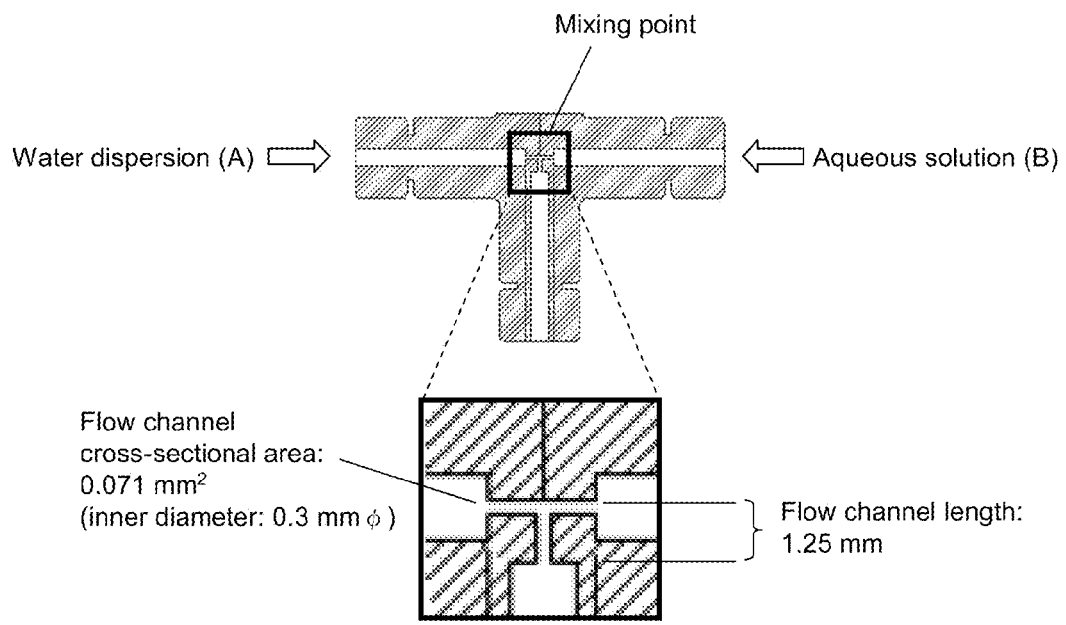
FIG. 7 is a schematic representation of a T-shaped microchannel employed in Examples III-1 to III-6 and III-8 and Comparative Examples III-1 and III-3.

Two syringe pumps (PHD-4400, product of Harvard Apparatus) were connected, via polyethylene tubes, to a microchannel as shown in FIG. 7 (chromatograph joint (tube fitting), Low Dead Volume Union Tee SS-1F0-3GC (product of Swagelok), inner diameter: 0.3 mm, flow channel cross-sectional area: 0.071 mm$^2$, flow channel length: 1.25 mm, made of stainless steel), so that liquids from the two syringe pumps were fed at a minimum angle of 180° and brought into contact with each other in the microchannel, and so that the resultant mixture was fed from the microchannel to a beaker at a minimum angle of 90° with respect to the flow channel through which each of the liquids flowed before mixing.

Subsequently, the water dispersion (A-1) of solid-solution-pigment-containing anionic polymer particles produced in Preparation Example 3 (50.0 g) was charged into a stainless steel syringe (DCI70-2255, product of Harvard Apparatus) attached to one of the syringe pumps (PHD-4400, product of Harvard Apparatus). Similarly, a 0.105% by weight aqueous solution (B-1) of polyethyleneimine (product of Wako Pure Chemical Industries, Ltd., number average molecular weight (Mn): 70,000) (50 g) was charged into a syringe attached to the other syringe pump PHD-4400.

Then, the syringe pumps were simultaneously operated so that, as shown in FIG. 7, the water dispersion (A-1) was fed into the microchannel from the left side (at 10 mL/minute),

TABLE 2

| | Water dispersion | | | | Evaluation results of water-based ink | | |
|---|---|---|---|---|---|---|---|
| Preparation Example of water-based ink | Preparation Example | Solid solution pigment, etc. | Component (b), etc. of anionic polymer | Cationic polymer | Storage stability (%) | Optical density | Chroma |
| Ex. II-3 | Ex. II-1 | 2BC | BzMA | Polyethyleneimine | 8 | 1.17 | 64.03 |
| Ex. II-4 | Ex. II-2 | 2BC | BzA | Polyethyleneimine | 6 | 1.14 | 63.88 |
| Comp. Ex. II-5 | Comp. Ex. II-1 | 2BC | Styrene | Polyethyleneimine | 20 | 1.10 | 62.44 |
| Comp. Ex. II-6 | Comp. Ex. II-2 | RY | BzMA | Polyethyleneimine | 12 | 1.06 | 60.30 |
| Comp. Ex. II-7 | Comp. Ex. II-3 | RG | BzMA | Polyethyleneimine | 5 | 1.04 | 55.91 |
| Comp. Ex. II-8 | Comp. Ex. II-4 | 2BC | BzMA | None | 5 | 1.08 | 63.52 |

2BC: Solid solution pigment formed of 2,9-dichloroquinacridone and non-substituted quinacridone, Chromophthal Jet Magenta 2BC (trade name), product of BASF Japan Ltd.
RY: Solid solution pigment formed of 2,9-dimethylquinacridone and non-substituted quinacridone, Fastgen Super Magenta RY (trade name), product of DIC Corporation
RG: Pigment formed of 2,9-dimethylquinacridone, Fastgen Super Magenta RG (trade name), product of DIC Corporation
BzMA: Benzyl methacrylate
BzA: Benzyl acrylate
Polyethyleneimine: Epomin SP-200, product of Nippon Shokubai Co., Ltd., number average molecular weight: 10,000

As is clear from Table 2, the inks of Examples II-3 and II-4 provide higher optical density and chroma, and exhibit more excellent storage stability, as compared with the inks of Comparative Examples II-5 to II-8.

Preparation Example 3

Preparation of Water Dispersion of Solid-Solution-Pigment-Containing Anionic Polymer Particles A water dispersion (A-1) of pigment-containing anionic polymer particles [solid content: 28.5%, average particle and the aqueous solution (B-1) was fed thereinto from the right side (at 10 mL/minute) (linear velocity in the channel: 4.7 m/second).

An epoxy cross-linking agent (Denacol EX-321 (trade name), product of Nagase Chemtex Corporation, epoxy equivalent: 140) (0.4 g) was added to the thus-produced dispersion (80 g), and the resultant mixture was maintained in a hot bath at 90° C. for 1.5 hours under stirring. After cooling, the resultant product was concentrated so as to attain a pigment solid content of 16%, and then filtered with the aforementioned filter having a pore size of 5 μm (product of Sartorius Stedim Biotech) for removal of coarse particles, to thereby produce a water dispersion for ink-jet printing containing particles having an average particle size of 145 nm.

The results of evaluation of filterability are shown in Table 3. The amount of filter-passing dispersion (for evaluation of filterability) was found to be 10 g.

Example III-2

Production of Water Dispersion for Ink-Jet Printing

The procedure of Example III-1 was repeated, except that the feed rate of each liquid was changed to 60 mL/minute (linear velocity in the channel: 28.3 m/second), to thereby produce a water dispersion for ink-jet printing. The amount of filter-passing dispersion (for evaluation of filterability) was found to be 20 g.

Example III-3

Production of Water Dispersion for Ink-Jet Printing

The procedure of Example III-1 was repeated, except that the feed rate of the water dispersion (A-1) of solid-solution-pigment-containing anionic polymer particles produced in Preparation Example 3 was changed to 60 mL/minute, and the feed rate of the aqueous polyethyleneimine solution (B-1) was changed to 40 mL/minute (linear velocity in the channel: 23.6 m/second), to thereby produce a water dispersion for ink-jet printing. The amount of filter-passing dispersion (for evaluation of filterability) was found to be 25 g or more (i.e., a total of 25 g passed).

Example III-4

Production of Water Dispersion for Ink-Jet Printing

The procedure of Example III-1 was repeated, except that the water dispersion (A-1) of solid-solution-pigment-containing anionic polymer particles produced in Preparation Example 3 was diluted with ion-exchange water to 15.0% by weight, and the polyethyleneimine concentration of the aqueous solution (B-1) was changed to 0.055% by weight, to thereby produce a water dispersion for ink-jet printing. The amount of filter-passing dispersion (for evaluation of filterability) was found to be 25 g or more (i.e., a total of 25 g passed).

Example III-5

Production of Water Dispersion for Ink-Jet Printing

The procedure of Example III-2 was repeated, except that the polyethyleneimine was replaced with polyethyleneimine having a number average molecular weight (Mn) of 10,000 (product of Wako Pure Chemical Industries, Ltd.), to thereby produce a water dispersion for ink-jet printing. The amount of filter-passing dispersion (for evaluation of filterability) was found to be 25 g or more (i.e., a total of 25 g passed).

Example III-6

Production of Water Dispersion for Ink-Jet Printing

The procedure of Example III-1 was repeated, except that the polyethyleneimine was replaced with polyethyleneimine having a number average molecular weight (Mn) of 1,800 (product of Wako Pure Chemical Industries, Ltd.), and the polyethyleneimine concentration of the aqueous solution was changed to 0.070%, to thereby produce a water dispersion for ink-jet printing. The amount of filter-passing dispersion (for evaluation of filterability) was found to be 25 g or more (i.e., a total of 25 g passed).

Example III-7 (Production of water dispersion for ink-jet printing)

The procedure of Example III-1 was repeated, except that the microchannel was replaced with Microvolume Connector MY1XCS6 (Y-shaped, flow channel cross-sectional area: 0.018 mm$^2$, flow channel length: 1.25 mm) (product of GL Sciences Inc.) (linear velocity in the channel: 18.9 m/second), to thereby produce a water dispersion for ink-jet printing. The amount of filter-passing dispersion (for evaluation of filterability) was found to be 25 g or more (i.e., a total of 25 g passed).

Example III-8

Production of Water Dispersion for Ink-Jet Printing

The procedure of Example III-1 was repeated, except that the polyethyleneimine concentration of the aqueous solution (B-1) was changed to 0.210% by weight, and the feed rate of each liquid was changed to 40 mL/minute (linear velocity in the channel: 18.9 m/second), to thereby produce a water dispersion for ink-jet printing. The amount of filter-passing dispersion (for evaluation of filterability) was found to be 5 g.

Example III-9

Production of Water Dispersion for Ink-Jet Printing

The procedure of Example III-1 was repeated, except that the microchannel was replaced with Micromixer YM-2 (product of Yamatake Corporation, flow channel cross-sectional area: 0.126 mm$^2$, flow channel length: about 8 mm, made of stainless steel), and the feed rate of each liquid was changed to 80 mL/minute (linear velocity in the channel: 21.2 m/second), to thereby produce a water dispersion for ink-jet printing. The amount of filter-passing dispersion (for evaluation of filterability) was found to be 5 g.

Comparative Example III-1

Production of Water Dispersion for Ink-Jet Printing

The procedure of Example III-1 was repeated, except that the water dispersion (A-1) of solid-solution-pigment-containing anionic polymer particles produced in Preparation Example 3 was diluted with ion-exchange water to attain a solid content of 20.0% by weight, to thereby produce a water dispersion for ink-jet printing. The amount of filter-passing dispersion (for evaluation of filterability) was found to be 25 g or more (i.e., a total of 25 g passed).

Comparative Example III-2

Production of Water Dispersion for Ink-Jet Printing

The water dispersion (A-1) of solid-solution-pigment-containing anionic polymer particles produced in Preparation Example 3 (50.0 g) and a 0.105% by weight aqueous solution of polyethyleneimine (50.0 g) were placed in a beaker (the amount of the cationic groups of polyethyleneimine was 15 mol % with respect to the anionic groups of the anionic organic pigment particles), and mixed together with a magnetic stirrer. However, the resultant dispersion failed to be filtered, since large amounts of coarse aggregates were formed.

Comparative Example III-3

Production of Water Dispersion for Ink-Jet Printing

The procedure of Example III-1 was repeated, except that the feed rate of each liquid was changed to 2 mL/minute (linear velocity in the channel: 0.9 m/second). However, the resultant dispersion failed to be filtered, since large amounts of coarse aggregates were formed.

Comparative Example III-4

Production of Water Dispersion for Ink-Jet Printing

The procedure of Example III-2 was repeated, except that the aqueous polyethyleneimine solution (B-1) was changed to ion-exchange water, to thereby produce a water dispersion for ink-jet printing. The amount of filter-passing dispersion (for evaluation of filterability) was found to be 25 g or more (i.e., a total of 25 g passed).

Comparative Example III-5

Production of Water Dispersion for Ink-Jet Printing

The procedure of Example III-1 was repeated, except that the microchannel was replaced with Microchemical Chip ICC-SY-10 (product of Institute of Microchemical Technology Co., Ltd., flow channel cross-sectional area: 0.004 mm$^2$, flow channel length: 80 mm), and the feed rate of each liquid was changed to 0.3 mL/minute (linear velocity in the channel: 2.0 m/second). However, a water dispersion failed to be produced, since aggregates were formed in the flow channel, and the flow channel was clogged with the aggregates.

Example III-10

Production of Water-Based Ink 1,2-Hexanediol (product of Tokyo Chemical Industry Co., Ltd.) (2.0 parts), 2-pyrrolidone (product of Wako Pure Chemical Industries, Ltd.) (2.0 parts), Surfynol 465 (product of Nisshin Chemical Industry Co., Ltd.) (0.5 parts), Olfine E1010 (product of Nisshin Chemical Industry Co., Ltd.) (0.5 parts), glycerin (product of Kao Corporation) (2.0 parts), triethylene glycol monobutyl ether (Butyl Triglycol (trade name), product of Nippon Nyukazai Co., Ltd.) (10.0 parts), Proxel XL2 (product of Arch Chemicals Japan, Inc.) (0.3 parts), and ion-exchange water were mixed together under stirring with a magnetic stirrer, followed by further stirring at room temperature for 15 minutes, to thereby prepare a solution mixture. The amount of ion-exchange water incorporated was adjusted so that the total amount of the solution mixture and the water dispersion for ink-jet printing produced in Example III-1 was 100 parts.

Subsequently, while the water dispersion for ink-jet printing produced in Example III-1 (62.5 parts (10.0 parts as reduced to pigment content of water-based ink)) was stirred with a magnetic stirrer, the above-prepared solution mixture was added thereto. The resultant mixture was filtered with the aforementioned filter having a pore size of 5 to thereby produce a water-based ink. The results are shown in Table 3.

Examples III-11 to III-18 and Comparative Examples III-6 to III-9

Production of Water-Based Ink

The procedure of Example III-10 was repeated, except that the water dispersions produced in Examples III-2 to III-9 and Comparative Examples III-1 to III-4 were employed in combination with other factors shown in Table 3, to thereby produce water-based inks. The results are shown in Table 3.

TABLE 3

| Water dispersion | Anionic pigment particles | Mn of water-soluble cationic polymer (polyethylene-imine) | Ratio of cationic groups/ anionic groups (mol %) | Flow channel cross-sectional area (mm$^2$) | Flow channel length (mm) | Linear velocity in channel (m/second) | Average particle size of particles contained in water dispersion (nm) | Filterability (amount of filter-passing dispersion) (g) | Water-based ink | Optical density |
|---|---|---|---|---|---|---|---|---|---|---|
| Ex. III-1 | Prep. Ex. 1 | 70000 | 15 | 0.071 | 1.25 | 4.7 | 145 | 10 | Ex. III-10 | 1.15 |
| Ex. III-2 | Prep. Ex. 1 | 70000 | 15 | 0.071 | 1.25 | 28.3 | 224 | 20 | Ex. III-11 | 1.18 |
| Ex. III-3 | Prep. Ex. 1 | 70000 | 10 | 0.071 | 1.25 | 23.6 | 151 | >25 | Ex. III-12 | 1.14 |
| Ex. III-4 | Prep. Ex. 1 | 70000 | 15 | 0.071 | 1.25 | 4.7 | 130 | >25 | Ex. III-13 | 1.13 |
| Ex. III-5 | Prep. Ex. 1 | 10000 | 15 | 0.071 | 1.25 | 28.3 | 192 | >25 | Ex. III-14 | 1.16 |
| Ex. III-6 | Prep. Ex. 1 | 1800 | 10 | 0.071 | 1.25 | 4.7 | 95 | >25 | Ex. III-15 | 1.11 |
| Ex. III-7 | Prep. Ex. 1 | 70000 | 15 | 0.018 | 1.25 | 18.9 | 175 | >25 | Ex. III-16 | 1.18 |
| Ex. III-8 | Prep. Ex. 1 | 70000 | 30 | 0.071 | 1.25 | 18.9 | 440 | 5 | Ex. III-17 | 1.10 |
| Ex. III-9 | Prep. Ex. 1 | 70000 | 15 | 0.126 | 8 | 21.2 | 390 | 5 | Ex. III-18 | 1.11 |
| Comp. Ex. III-1 | Prep. Ex. 1 | — | — | — | — | — | 77 | >25 | Comp. Ex. III-6 | 1.08 |
| Comp. Ex. III-2 | Prep. Ex. 1 | 70000 | 15 | — | — | — | — | Not filtered | Comp. Ex. III-7 | — |
| Comp. Ex. III-3 | Prep. Ex. 1 | 70000 | 15 | 0.071 | 1.25 | 0.9 | — | Not filtered | Comp. Ex. III-8 | — |
| Comp. Ex. III-4 | Prep. Ex. 1 | — | 0 | 0.071 | 1.25 | 28.3 | 77 | >25 | Comp. Ex. III-9 | 1.08 |
| Comp. Ex. III-5 | Prep. Ex. 1 | 70000 | 15 | 0.004 | 80 | 2.0 | — | Not mixed | — | — |

As is clear from Table 3, the water dispersions of Examples III-1 to III-9 exhibit more excellent filterability as compared with those of Comparative Examples, and the water-based inks of Examples III-10 to III-18 provide higher optical density as compared with those of Comparative Examples. These data indicate that both filterability and optical density can be improved together.

Example IV-1

Production of Water Dispersion for Ink-Jet Printing

The water dispersion of solid-solution-pigment-containing anionic polymer particles produced in Preparation Example 2 (50.0 g) was placed in a 100-mL tall beaker. Then, a stator of a biomixer (model: BM-2, product of Nihonseiki Corporation., generator shaft model: NS-10, rotor diameter: 8 mm, gap between the inner surface of the stator and the outer surface of the rotor: 0.14 mm) having a stainless steel tube (inner diameter: 0.7 mm) attached to the outside of the stator, was inserted into the water dispersion in the beaker. The beaker was placed in a water bath at 5° C. While the water dispersion was stirred at a rotational speed of 20,000 rotations/minute, a 0.45% by weight aqueous solution of polyethyleneimine (number average molecular weight: about 10,000) (product of Wako Pure Chemical Industries, Ltd.) (6.1 g) was added to the water dispersion at a rate of 3.5 mL/minute. The resultant dispersion was filtered with the aforementioned filter having a pore size of 5 μm (product of Sartorius Stedim Biotech), to thereby remove coarse particles.

An epoxy cross-linking agent (Denacol EX-321 (trade name), product of Nagase Chemtex Corporation, epoxy equivalent: 140) (0.31 g) was added to the thus-produced dispersion, and the resultant mixture was maintained in a hot bath at 90° C. for 1.5 hours under stirring. After cooling, the resultant product was filtered with the aforementioned filter having a pore size of 5 μm for removal of coarse particles, to thereby produce a water dispersion for ink-jet printing containing pigment-containing polymer particles having an average particle size of 115 nm. The results of evaluation of filterability are shown in Table 4.

The shear speed was as follows: (0.008 (m)×3.14)×333 (rotations/second)=8.4 (m/second). The cationic polymer was added to and brought into contact with the water dispersion within a zone defined by a hypothetical hollow cylinder, placed such that the center of the cylinder coincides with the center of the rotary shaft of the rotor and having a circular bottom having a radius 1.5 times that of the rotor, wherein (the distance between the center of the rotary shaft of the rotor and the liquid contact surface of the stainless steel tube)/(the radius of the rotor)=6 mm/4 mm.

Example IV-2

Production of Water Dispersion for Ink-Jet Printing

The procedure of Example IV-1 was repeated, except that the rotational speed of the biomixer was changed to 10,000 rotations/minute, to thereby produce a water dispersion for ink-jet printing containing pigment-containing polymer particles having an average particle size of 116 nm.

Example IV-3

Production of Water Dispersion for Ink-Jet Printing

The procedure of Example IV-1 was repeated, except that the 0.45% by weight aqueous solution of polyethyleneimine (number average molecular weight: about 10,000) (product of Wako Pure Chemical Industries, Ltd.) was changed to a 0.35% by weight aqueous solution of the polyethyleneimine (14.2 g), to thereby produce a water dispersion for ink-jet printing containing pigment-containing polymer particles having an average particle size of 125 nm.

Example IV-4

Production of Water Dispersion for Ink-Jet Printing

The procedure of Example IV-1 was repeated, except that the biomixer was replaced with a homomixer (model: T.K. Homo Mixer, product of Primix Corporation, rotational portion: T.K. Robomix, rotational speed: 7,500 rpm, rotor diameter: 26 mm, gap between the inner surface of the stator and the outer surface of the rotor: 1.3 mm), to thereby produce a water dispersion for ink-jet printing containing pigment-containing polymer particles having an average particle size of 105 nm.

The shear speed was as follows: (0.026 (m)×3.14)×125 (rotations/second)=10.2 (m/second). The cationic polymer was added to and brought into contact with the water dispersion within a zone defined by a hypothetical hollow cylinder, placed such that the center of the cylinder coincides with the center of the rotary shaft of the rotor and having a circular bottom having a radius 1.38 times that of the rotor, wherein (the distance between the center of the rotary shaft of the rotor and the liquid contact surface of the stainless steel tube)/(the radius of the rotor)=18 mm/13 mm.

Comparative Example IV-1

Production of Water Dispersion for Ink-Jet Printing

The procedure of Example IV-1 was repeated, except that the rotational speed of the biomixer was changed to 2,000 rotations/minute. However, the resultant dispersion exhibited poor filterability, and a coloring material failed to be produced in an amount sufficient for evaluation.

Comparative Example IV-2

Production of Water Dispersion for Ink-Jet Printing

The procedure of Example IV-1 was repeated, except that the biomixer was replaced with a disper (model: T.K. Homo Disper 2.5, rotational speed: 3,000 rpm, blade diameter: 28 mm), to thereby produce a water dispersion for ink-jet printing containing pigment-containing polymer particles having an average particle size of 96 nm.

The shear speed was as follows: (0.028 (m)×3.14)×50 (rotations/second)=4.4 (m/second). The cationic polymer was added to and brought into contact with the water dispersion within a zone defined by a hypothetical hollow cylinder, placed such that the center of the cylinder coincides with the center of the rotary shaft of the blade and having a circular bottom having a radius 1.43 times that of the blade, wherein (the distance between the center of the rotary shaft of the blade and the liquid contact surface of the stainless steel tube)/(the radius of the blade)=20 mm/14 mm.

Comparative Example IV-3

Production of Water Dispersion for Ink-Jet Printing

The procedure of Example IV-1 was repeated, except that the biomixer was replaced with a bead mill disperser (sand mill, model: Sand Grinder 6TSG-1/4, product of Aimex Co., Ltd., medium particles: zirconia beads, particle size: 0.05 mm, percent charge of beads: 65%, rotational speed: 1,500 rpm, blade diameter: 70 mm), and a step of removing impurities was carried out by means of a centrifuge (6,000 G, 20 minutes) as a pretreatment of filtration before cross-linking reaction, to thereby produce a water dispersion for ink-jet printing containing pigment-containing polymer particles having an average particle size of 85 nm.

The shear speed was as follows: (0.07 (m)×3.14)×25 (rotations/second)=5.5 (m/second). The cationic polymer was added to and brought into contact with the water dispersion within a zone defined by a hypothetical hollow cylinder, placed such that the center of the cylinder coincides with the center of the rotary shaft of the blade and having a circular bottom having a radius 1.29 times that of the blade, wherein (the distance between the center of the rotary shaft of the blade and the liquid contact surface of the stainless steel tube)/(the radius of the blade)=45 mm/35 mm.

Comparative Example IV-4

Production of Water Dispersion for Ink-Jet Printing

The procedure of Example IV-1 was repeated, except that the biomixer was replaced with a magnetic stirrer (product of AS ONE Corporation, model: REXIM RS-6A, rotational speed: 300 rpm, Teflon (registered trademark) stirrer bar: 20 mm×8 mm in diameter). However, the resultant dispersion exhibited poor filterability, and a coloring material failed to be produced in an amount sufficient for evaluation.

The shear speed was as follows: (0.02 (m)×3.14)×5 (rotations/second)=0.3 (m/second). The cationic polymer was added to and brought into contact with the water dispersion within a zone defined by a hypothetical hollow cylinder, placed such that the center of the cylinder coincides with the center of the rotary axis of the stirring bar and having a circular bottom having a radius 1.25 times that of the rotating stirring bar, wherein (the distance between the center of the rotary axis of the stirring bar and the liquid contact surface of the stainless steel tube)/(the length of the stirring bar/2)=12.5 mm/10 mm.

Comparative Example IV-5

Production of Water Dispersion for Ink-Jet Printing

The procedure of Example IV-1 was repeated, except that the following mixing method was carried out in place of mixing by means of the biomixer, and a step of removing impurities was carried out by means of a centrifuge (6,000 G, 20 minutes) as a pretreatment of filtration before cross-linking reaction, to thereby produce a water dispersion for ink-jet printing containing pigment-containing polymer particles having an average particle size of 88 nm.

Mixing method: In a manner similar to that described above in Comparative Example IV-4, while the water dispersion of pigment-containing anionic polymer particles produced in Preparation Example 2 (500 g) was stirred by means of a magnetic stirrer, a 0.45% by weight aqueous solution of polyethyleneimine (number average molecular weight: about 10,000) (61 g) was added to the water dispersion, and the resultant mixture was subjected to further dispersion treatment (total: 5 passes) by means of Micro Fluidizer (trade name, high-pressure homogenizer, model: M-140K, product of Microfluidics) at 150 MPa.

Comparative Example IV-6

Production of Water Dispersion for Ink-Jet Printing

The procedure of Example IV-1 was repeated, except that the following mixing method was carried out in place of mixing by means of the biomixer. However, the resultant dispersion exhibited poor filterability, and a coloring material failed to be produced in an amount sufficient for evaluation.

Mixing method: The water dispersion of solid-solution-pigment-containing anionic polymer particles produced in Preparation Example 2 (50.0 g) was placed in a 100-mL screw tube, and then a 0.45% by weight aqueous solution of polyethyleneimine (number average molecular weight: about 10,000) (product of Wako Pure Chemical Industries, Ltd.) (6.1 g) was added to the screw tube. Thereafter, the tube was capped, and mixing was carried out by manual shaking for about one minute.

Comparative Example IV-7

Production of Water Dispersion for Ink-Jet Printing

The procedure of Example IV-1 was repeated, except that the 0.45% by weight aqueous solution of polyethyleneimine (number average molecular weight: about 10,000) (product of Wako Pure Chemical Industries, Ltd.) (6.1 g) was replaced with ion-exchange water (6.1 g), to thereby produce a water dispersion for ink-jet printing containing pigment-containing polymer particles having an average particle size of 83 nm.

Example IV-5

Production of Ink 1,2-Hexanediol (product of Tokyo Chemical Industry Co., Ltd.) (2.0 parts), 2-pyrrolidone (product of Wako Pure Chemical Industries, Ltd.) (2.0 parts), Surfynol 465 (product of Nisshin Chemical Industry Co., Ltd.) (0.5 parts), Olfine E1010 (product of Nisshin Chemical Industry Co., Ltd.) (0.5 parts), glycerin (product of Kao Corporation) (2.0 parts), triethylene glycol monobutyl ether (Butyl Triglycol (trade name), product of Nippon Nyukazai Co., Ltd.) (10.0 parts), Proxel XL2 (product of Arch Chemicals Japan, Inc.) (0.3 parts), and ion-exchange water were mixed together under stirring with a magnetic stirrer, followed by further stirring at room temperature for 15 minutes, to thereby prepare a solution mixture. The amount of ion-exchange water incorporated was adjusted so that the total amount of the solution mixture and the water dispersion for ink-jet printing produced in Example IV-1 was 100 parts.

Subsequently, while the water dispersion for ink-jet printing produced in Example IV-1 (41.7 parts (10.0 parts as reduced to pigment content)) was stirred with a magnetic stirrer, the above-prepared solution mixture was added thereto. The resultant mixture was filtered with the aforementioned filter having a pore size of 5 μm, to thereby produce a water-based ink. The results of evaluation of optical density are shown in Table 4.

Examples IV-6 to IV-8 and Comparative Examples IV-8 to IV-14

Production of Ink

The procedure of Example IV-5 was repeated, except that the water dispersion for ink-jet printing produced in Example IV-1 was replaced with the water dispersions for ink-jet printing produced in Examples IV-2 to IV-4 and Comparative Examples IV-1 to IV-7 as shown in Table 4, to thereby produce water-based inks.

from the water dispersion by means of a 200-mesh metal net, to thereby produce a water dispersion (2) for ink-jet printing containing pigment-containing anionic polymer particles and polyethyleneimine.

TABLE 4

Production of water dispersion

| Production of ink | Production Example | Anionic polymer particles | Cationic polymer*1 | Ratio by weight of anionic particles/cationic polymer*2 | Disperser | Shear speed at addition point (m/second) | Addition point*3 (/rotor radius) | Water dispersion Filterability (mL) | Ink Optical density |
|---|---|---|---|---|---|---|---|---|---|
| Ex. IV-5 | Ex. IV-1 | Prep. Ex. 2 | Polyethyleneimine | 555 | Biomixer | 8.4 | 1.5 | 25 or more | 1.14 |
| Ex. IV-6 | Ex. IV-2 | Prep. Ex. 2 | Polyethyleneimine | 555 | Biomixer | 4.2 | 1.5 | 15 | 1.14 |
| Ex. IV-7 | Ex. IV-3 | Prep. Ex. 2 | Polyethyleneimine | 303 | Biomixer | 8.4 | 1.5 | 25 or more | 1.18 |
| Ex. IV-8 | Ex. IV-4 | Prep. Ex. 2 | Polyethyleneimine | 555 | Homomixer | 10.2 | 1.38 | 15 | 1.12 |
| Comp. Ex. IV-8 | Comp. Ex. IV-1 | Prep. Ex. 2 | Polyethyleneimine | 555 | Biomixer | 0.8 | 1.5 | 0.2 | —*5 |
| Comp. Ex. IV-9 | Comp. Ex. IV-2 | Prep. Ex. 2 | Polyethyleneimine | 555 | Disper | 4.4 | 1.43 | 1.0 | 1.09 |
| Comp. Ex. IV-10 | Comp. Ex. IV-3 | Prep. Ex. 2 | Polyethyleneimine | 555 | Bead mill | 5.5 | 1.29 | 25 or more | 1.08 |
| Comp. Ex. IV-11 | Comp. Ex. IV-4 | Prep. Ex. 2 | Polyethyleneimine | 555 | Magnetic stirrer | 0.3 | 1.25 | 0.2 | —*5 |
| Comp. Ex. IV-12 | Comp. Ex. IV-5 | Prep. Ex. 2 | Polyethyleneimine | 555 | Micro Fluidizer | *4 | — | 25 or more | 1.08 |
| Comp. Ex. IV-13 | Comp. Ex. IV-6 | Prep. Ex. 2 | Polyethyleneimine | 555 | None | 0.0 | — | 0 | —*5 |
| Comp. Ex. IV-14 | Comp. Ex. IV-7 | Prep. Ex. 2 | None | 0 | Biomixer | 8.4 | 1.5 | 25 or more | 1.08 |

*1Polyethyleneimine, Epomin SP-200, product of Nippon Shokubai Co., Ltd., number average molecular weight: 10,000
*2Ratio by weight of [colorant-containing water-insoluble anionic polymer particles/cationic polymer]
*3Distance from the center of the rotary shaft of the rotor (in the case where the rotor radius is taken as 1)
*4Dispersion treatment after mixing with a magnetic stirrer
*5Failed to be filtered and printed As is clear from Table 4, the water dispersions of Examples IV-1 to IV-4 exhibit more excellent filterability as compared with those of Comparative Examples IV-1, IV-2, IV-4, and IV-6, and the inks of Examples IV-5 to IV-8 provide higher optical density as compared with those of Comparative Examples IV-9, IV-10, IV-12, and IV-14; i.e., the water dispersions and water-based inks of the Examples provide excellent optical density and exhibit high filterability.

Example V-1

Preparation of Water Dispersion (3) for Ink-Jet Printing

Step (a): The water dispersion of solid-solution-pigment-containing anionic polymer particles produced in Preparation Example 2 (50 parts) was placed in a 100-mL glass beaker. 1N Aqueous sodium hydroxide was added to the water dispersion under stirring at 20° C., and the pH of the water dispersion was adjusted to 11 while the pH in the system was observed by means of a pH meter (F-23 (trade name), product of Horiba Ltd.).

Step (b): Subsequently, to the water dispersion was added an aqueous solution (2.8 parts) of polyethyleneimine (Epomin SP-200 (trade name), product of Nippon Shokubai Co., Ltd., number average molecular weight (Mn): 10,000) serving as a cationic polymer (solid content: 1%). After stirring for 10 minutes, a cation exchange resin (Amberlite IR120BNA (trade name), product of Rohm and Haas) (3.5 parts) was added to the water dispersion. While the pH of the water dispersion was observed by means of the aforementioned pH meter (F-23, trade name), the water dispersion was further stirred until the pH reached 8. Immediately after the pH had reached 8, the cation exchange resin was separated Step (c): An epoxy cross-linking agent (Denacol EX-321 (trade name), product of Nagase Chemtex Corporation, epoxy equivalent: 140) (0.47 g) and ion-exchange water (1.07 g) were added to the water dispersion (2) produced in step (b) (40 g), and the resultant mixture was maintained in a hot bath at 90° C. for one hour under stirring. After cooling, the resultant product was filtered with the aforementioned filter (product of Sartorius Stedim Biotech, pore size: 5 μm) for removal of coarse particles, to thereby produce a water dispersion (3) for ink-jet printing containing polyethyleneimine and pigment-containing anionic cross-linked polymer particles having an average particle size of 147 nm (percent cross-linking of the cross-linked polymer as determined by the aforementioned formula (3): 56.8 mol %).

Example V-2

Preparation of Water Dispersion (4) for Ink-Jet Printing

The procedure of Example V-1 was repeated, except that the polyethyleneimine employed in step (b) was replaced with an aqueous solution (2.5 parts) of polyallylamine (PAA-15 (trade name), product of Nitto Boseki Co., Ltd., number average molecular weight: 15,000) (solid content: 1%), to thereby produce a water dispersion (4) for ink-jet printing containing pigment-containing anionic polymer particles and polyallylamine.

Example V-3

Preparation of Water Dispersion (5) for Ink-Jet Printing

The procedure of Example V-1 was repeated, except that, in place of the cation exchange resin employed in step (b), 1N aqueous hydrochloric acid was added until the pH in the system reached 8, to thereby produce a water dispersion (5) for ink-jet printing containing pigment-containing anionic polymer particles and polyethyleneimine.

Example V-4

Preparation of Water Dispersion (6) for Ink-Jet Printing

The procedure of Example V-1 was repeated, except that, in step (a), 1N aqueous sodium hydroxide was added until the pH in the system reached 9, to thereby produce a water dispersion (6) for ink-jet printing containing pigment-containing anionic polymer particles and polyethyleneimine.

Comparative Example V-1

Preparation of Water Dispersion (7) for Ink-Jet Printing

The procedure of Example V-1 was repeated, except that, in steps (a) and (b), 1N aqueous sodium hydroxide was not employed, and the pH in the system was not adjusted, to thereby produce a water dispersion (7) for ink-jet printing containing pigment-containing anionic polymer particles and polyethylene imine.

Comparative Example V-2

Preparation of Water Dispersion (8) for Ink-Jet Printing

The procedure of Example V-1 was repeated, except that polyethyleneimine was not added in step (a), to thereby produce a water dispersion (8) for ink-jet printing containing pigment-containing anionic polymer particles.

Comparative Example V-3

Preparation of Water Dispersion (9) for Ink-Jet Printing

The procedure of Example V-1 was repeated, except that, in step (b), the cation exchange resin was not employed, and the pH in the system was not adjusted, to thereby produce a water dispersion (9) for ink-jet printing containing pigment-containing anionic polymer particles and polyethyleneimine.

Comparative Example V-4

Preparation of Water Dispersion (10) for Ink-Jet Printing

The procedure of Example V-1 was repeated, except that, in steps (a) and (b), after addition of the cation exchange resin, the resultant mixture was stirred until the pH in the system reached 5, and immediately after the pH had reached 5, the cation exchange resin was separated from the mixture by means of a 200-mesh metal net, to thereby produce a water dispersion (10) for ink-jet printing containing pigment-containing anionic polymer particles and polyethyleneimine.

Comparative Example V-5

Preparation of Water Dispersion (11) for Ink-Jet Printing

The procedure of Example V-1 was repeated, except that, in step (a), 1N aqueous sodium hydroxide was added until the pH in the system reached 8, and, in step (b), the cation exchange resin was not employed, and the pH in the system was not adjusted, to thereby produce a water dispersion (11) for ink-jet printing containing pigment-containing anionic polymer particles and polyethyleneimine.

Formulation Example

Production of Water-Based Ink

Each of the water dispersions (3) to (7), and (9) to (ii) for ink-jet printing produced in Examples V-1 to V-4 and Comparative Examples V-1 and V-3 to V-5 containing the pigment-containing anionic polymer particles and the cationic polymer, or the water dispersion (8) for ink-jet printing produced in Comparative Examples V-2 containing the pigment-containing anionic polymer particles was provided in an amount of 12.5 parts (as reduced to solid content) or 10.0 parts (as reduced to pigment content).

1,2-Hexanediol (product of Tokyo Chemical Industry Co., Ltd.) (2.0 parts), 2-pyrrolidone (product of Wako Pure Chemical Industries, Ltd.) (2.0 parts), Surfynol 465 (product of Nisshin Chemical Industry Co., Ltd.) (0.5 parts), Olfine E1010 (product of Nisshin Chemical Industry Co., Ltd.) (0.5 parts), glycerin (product of Kao Corporation) (2.0 parts), triethylene glycol monobutyl ether (Butyl Triglycol (trade name), product of Nippon Nyukazai Co., Ltd.) (10.0 parts), Proxel XL2 (product of Arch Chemicals Japan, Inc.) (0.3 parts), and ion-exchange water were mixed together under stirring with a magnetic stirrer, followed by further stirring at room temperature for 15 minutes, to thereby prepare a solution mixture. The amount of ion-exchange water incorporated was adjusted so that the total amount of the solution mixture and each of the aforementioned water dispersions (3) to (11) for ink-jet printing was 100 parts.

Subsequently, while each of the above-provided water dispersions (3) to (11) for ink-jet printing was stirred with a magnetic stirrer, the above-prepared solution mixture was added thereto. The resultant mixture was filtered with a 1.2-μm filter (cellulose acetate membrane, product of Sartorius Stedim Biotech), to thereby produce a water-based ink.

TABLE 5

| | Production conditions of water dispersion for ink-jet printing | | | | | Water dispersion | | Water-based ink |
|---|---|---|---|---|---|---|---|---|
| | Type of water dispersion | Initial pH | Cationic polymer | pH adjusting agent | pH after treatment | Filterability (mL) | Storage stability (%) | Optical density |
| Ex. V-1 | (3) | 11 | Polyethyleneimine | Cation exchange resin | 8 | 30 | 4 | 1.18 |
| Ex. V-2 | (4) | 11 | Polyallylamine | Cation exchange resin | 8 | 20 | 8 | 1.14 |

TABLE 5-continued

| | Production conditions of water dispersion for ink-jet printing | | | | | Evaluation results | | |
|---|---|---|---|---|---|---|---|---|
| | | | | | | Water dispersion | | Water-based ink |
| | Type of water dispersion | Initial pH | Cationic polymer | pH adjusting agent | pH after treatment | Filterability (mL) | Storage stability (%) | Optical density |
| Ex. V-3 | (5) | 11 | Polyethyleneimine | Hydrochloric acid | 8 | 25 | 15 | 1.16 |
| Ex. V-4 | (6) | 9 | Polyethyleneimine | Cation exchange resin | 8 | 25 | 8 | 1.15 |
| Comp. Ex. V-1 | (7) | 6 | Polyethyleneimine | Cation exchange resin | 4 | 1 | 40 | 1.03 |
| Comp. Ex. V-2 | (8) | 11 | None | Cation exchange resin | 8 | 10 | 10 | 1.07 |
| Comp. Ex. V-3 | (9) | 11 | Polyethyleneimine | None | 11 | 10 | 25 | 1.08 |
| Comp. Ex. V-4 | (10) | 11 | Polyethyleneimine | Cation exchange resin | 5 | 3 | 35 | 1.04 |
| Comp. Ex. V-5 | (11) | 8 | Polyethyleneimine | None | 8 | 8 | 25 | 1.07 |

Polyethyleneimine: Epomin SP-200, product of Nippon Shokubai Co., Ltd., number average molecular weight: 10,000
Cation exchange resin: Amberlite IR120B NA, product of Rohm and Haas
Polyallylamine: PAA-15, product of Nitto Boseki Co., Ltd., number average molecular weight: 15,000, containing an amino group
Hydrochloric acid: 1N-hydrochloric acid, product of Wako Pure Chemical Industries, Ltd.

As is clear from Table 5, the water dispersions and inks of Examples V-1 to V-4 exhibit more excellent filterability and storage stability, and provide higher optical density, as compared with those of Comparative Examples V-1 to V-5.

INDUSTRIAL APPLICABILITY

The water dispersion for ink-jet printing of the present invention, or the water-based ink of the invention containing the water dispersion attains excellent optical density of printed images, and exhibits, for example, excellent filterability and storage stability. Therefore, the water dispersion or the water-based ink can be suitably employed in various fields for ink-jet printing.

The invention claimed is:

1. A water dispersion for ink jet printing comprising chain-like particles each containing anionic organic pigment particles and a cationic polymer, wherein the ratio of organic pigment primary particles forming the chain-like particles to all the pigment primary particles contained in the water dispersion is 10% by number or more.

2. The water dispersion for ink-jet printing according to claim 1, wherein the anionic organic pigment particles are organic-pigment-containing water-insoluble anionic polymer particles.

3. The water dispersion for ink-jet printing according to claim 1, wherein the ratio of the average particle size of the particles contained in the water dispersion containing the chain-like particles to that of the anionic organic pigment particles (average particle size of the particles contained in the water dispersion containing the chain-like particles/average particle size of the anionic organic pigment particles), as determined through the dynamic light scattering method, is 1.5 to 5.0.

4. The water dispersion for ink-jet printing according to claim 2, wherein the polymer forming the water-insoluble anionic polymer particles is cross-linked by a cross-linking agent.

5. The water dispersion for ink-jet printing according to claim 2, wherein the polymer forming the water-insoluble anionic polymer particles is a polymer including a structural unit derived from benzyl methacrylate and/or benzyl acrylate in an amount of 30 to 80% by weight.

6. The water dispersion for ink-jet printing according to claim 2, wherein the polymer forming the water-insoluble anionic polymer particles is a polymer formed of units derived from monomers having the same polymerizable group.

7. The water dispersion for ink jet printing according to claim 6, wherein the polymerizable group of the monomers is a methacryloyl group.

8. The water dispersion for ink-jet printing according to claim 1, wherein the cationic polymer is a water-soluble cationic polymer.

9. The water dispersion for ink jet printing according to claim 8, wherein the water-soluble cationic polymer is polyethyleneimine.

10. The water dispersion for ink-jet printing according to claim 1, wherein the organic pigment is a solid solution pigment containing dichloroquinacridone.

11. The water dispersion for ink-jet printing according to claim 10, wherein the solid solution pigment contains dichloroquinacridone and non-substituted quinacridone.

12. A water-based ink for ink-jet printing comprising the water dispersion as recited in claim 1.

13. A method for producing the water dispersion for ink-jet printing as recited in claim 1, the method comprising the following steps (I) and (II):
   step (I): a step of preparing a mixture containing anionic organic pigment particles, the cationic polymer, and water, and then removing water from the mixture, to thereby prepare a viscous or solid product; and
   step (II): a step of mixing the viscous or solid product prepared in step (I) with water, to thereby produce a water dispersion (A).

14. The method for producing the water dispersion for ink-jet printing as recited in claim 1, the method comprising a step of mixing a water dispersion (A) containing anionic organic pigment particles with an aqueous solution (B) containing the cationic polymer in a flow channel having a cross-sectional area of 0.001 to 0.5 mm$^2$ and a length of 0.1 to 10 mm, wherein the water dispersion (A) and the aqueous solution (B) are mixed so that the linear velocity of each of the water dispersion (A) and the aqueous solution (B), as measured at a point in the channel where the water dispersion (A) meets the aqueous solution (B), is 1 m/second or more, and the amount of the cationic groups of the cationic polymer is 5 to 50 mol % with respect to that of the anionic groups of the anionic organic pigment particles.

15. The method for producing the water dispersion for ink-jet printing as recited in claim 2, the method comprising a step of adding the cationic polymer to a water dispersion containing organic-pigment-containing water-insoluble anionic polymer particles, by means of a rotary shear-type stirring apparatus having a rotor-stator structure at a shear speed of 1 m/second or more, wherein the cationic polymer is added to and brought into contact with the water dispersion within a zone defined by a hypothetical hollow cylinder, placed such that the center of the cylinder coincides with the center of the rotary shaft of the rotor and having a circular bottom having a radius twice that of the rotor of the stirring apparatus.

16. The method for producing the water dispersion for ink jet printing according to claim 15, wherein the cationic polymer is added so that the ratio by weight of the organic-pigment-containing water-insoluble anionic polymer particles to the cationic polymer [organic-pigment-containing water-insoluble anionic polymer particles/cationic polymer] is 100 to 1,000, in the cationic polymer addition step.

17. The method for producing the water dispersion for ink-jet printing according to claim 15, wherein the gap between the inner surface of the stator and the outer surface of the rotor is 50 μm or less.

18. The method for producing the water dispersion for ink-jet printing as recited in claim 2, the method comprising the following steps (a) and (b):
   step (a): a step of adjusting the pH of a water dispersion containing organic-pigment-containing water-insoluble anionic polymer particles to 8 to 12, and then adding the cationic polymer thereto; and
   step (b): a step of lowering and adjusting the pH of the water dispersion obtained in step (a) to 7 to 9.

19. The method for producing the water dispersion for ink-jet printing according to claim 18, wherein adjustment of the pH in step (b) is carried out by bringing the water dispersion into contact with a cation exchange resin.

* * * * *